(12) United States Patent
Downey

(10) Patent No.: US 12,478,401 B2
(45) Date of Patent: Nov. 25, 2025

(54) CONTROL OF AN ULTRASONIC HANDPIECE

(71) Applicant: Stryker Corporation, Kalamazoo, MI (US)

(72) Inventor: Adam D. Downey, Kalamazoo, MI (US)

(73) Assignee: Stryker Corporation, Portage, MI (US)

(*) Notice: Subject to any disclaimer, the term of this patent is extended or adjusted under 35 U.S.C. 154(b) by 800 days.

(21) Appl. No.: 17/784,711

(22) PCT Filed: Dec. 14, 2020

(86) PCT No.: PCT/US2020/064930
§ 371 (c)(1),
(2) Date: Jun. 13, 2022

(87) PCT Pub. No.: WO2021/119616
PCT Pub. Date: Jun. 17, 2021

(65) Prior Publication Data
US 2023/0014305 A1     Jan. 19, 2023

Related U.S. Application Data

(60) Provisional application No. 62/946,980, filed on Dec. 12, 2019.

(51) Int. Cl.
*A61B 17/32* (2006.01)
*A61B 17/00* (2006.01)
(Continued)

(52) U.S. Cl.
CPC ............... *A61B 17/320068* (2013.01); *A61B 2017/00026* (2013.01); *A61B 2017/320069* (2017.08);
(Continued)

(58) Field of Classification Search
CPC .. A61B 17/320068; A61B 2017/00026; A61B 2017/320069; A61B 2017/32007;
(Continued)

(56) References Cited

U.S. PATENT DOCUMENTS 5,520,633 A     5/1996   Costin
6,497,715 B2   12/2002  Satou
(Continued)

FOREIGN PATENT DOCUMENTS

CN          1901843 A      1/2007
CN          102458287 A    5/2012
(Continued)

OTHER PUBLICATIONS

International Search Report for Application No. PCT/US2020/064930 dated Mar. 25, 2021, 4 pages.
(Continued)

*Primary Examiner* — Theodore J Stigell
(74) *Attorney, Agent, or Firm* — Howard & Howard Attorneys PLLC

(57) ABSTRACT

Systems and methods for controlling vibrations of an ultrasonic handpiece generate an AC drive signal applied to a transducer of the ultrasonic handpiece to vibrate a tip of the ultrasonic handpiece. A property relating to a stiffness of tissue being contacted by the vibrating tip is determined based on a measured voltage and a measured current of the AC drive signal. A target displacement for the tip is determined based on the tissue property, and the AC drive signal is adjusted to achieve the determined target displacement.

20 Claims, 9 Drawing Sheets

(51) Int. Cl.
*A61B 34/10* (2016.01)
*A61B 90/00* (2016.01)

(52) U.S. Cl.
CPC .............. *A61B 2017/32007* (2017.08); *A61B 2034/104* (2016.02); *A61B 2090/08021* (2016.02)

(58) Field of Classification Search
CPC .... A61B 2034/104; A61B 2090/08021; A61B 2017/00017; A61B 2017/0003; B06B 3/00; B06B 2201/76; B06B 1/0253
See application file for complete search history.

(56) References Cited

U.S. PATENT DOCUMENTS

| | | | |
|---|---|---|---|
| 6,955,680 | B2 | 10/2005 | Satou et al. |
| 6,984,220 | B2 | 1/2006 | Wuchinich |
| 8,845,537 | B2 | 9/2014 | Tanaka et al. |
| 10,016,209 | B2 | 7/2018 | Downey et al. |
| 10,755,598 | B2 | 8/2020 | Simon |
| 11,317,936 | B2 | 5/2022 | James et al. |
| 11,468,792 | B2 | 10/2022 | Simon |
| 2004/0034340 | A1 | 2/2004 | Biscup |
| 2014/0142438 | A1 | 5/2014 | Ludwin et al. |
| 2015/0094723 | A1 | 4/2015 | Darian |
| 2016/0302812 | A1 | 10/2016 | Monroe et al. |
| 2017/0143369 | A1 | 5/2017 | Downey et al. |
| 2018/0056328 | A1 | 3/2018 | Downey et al. |
| 2019/0274707 | A1 | 9/2019 | Sawhney et al. |
| 2020/0093507 | A1 | 3/2020 | James et al. |

FOREIGN PATENT DOCUMENTS

| | | | |
|---|---|---|---|
| JP | H0299050 A | | 4/1990 |
| JP | H06506125 A | | 7/1994 |
| JP | 2001198136 A | | 7/2001 |
| WO | 2015021216 A1 | | 2/2015 |
| WO | WO-2015021216 | * | 2/2015 |
| WO | 2016183084 A1 | | 11/2016 |

OTHER PUBLICATIONS

English language abstract and machine-assisted English translation for JPH 02-99050 A extracted from espacenet.com database on Jul. 30, 2024, 6 pages.

English language abstract for JPH 06-506125 A extracted from espacenet.com database on Jul. 30, 2024, 1 page.

English language abstract and machine-assisted English translation for JP 2001-198136 A extracted from espacenet.com database on Jul. 30, 2024, 15 pages.

Machine-assisted English translation for CN 1901843 A extracted from espacenet.com database on Aug. 4, 2025, 24 pages.

English language abstract for CN 102458287 A extracted from espacenet.com database on Aug. 4, 2025, 2 pages.

* cited by examiner

CONTROL OF AN ULTRASONIC HANDPIECE

RELATED APPLICATIONS

This application is a national stage entry of PCT Application No. PCT/US2020/064930, filed on Dec. 14, 2020, which claims priority to U.S. Provisional Application No. 62/946,980, filed on Dec. 12, 2019. The contents of each of these applications are hereby incorporated by reference herein in their entirety.

BACKGROUND

Ultrasonic handpieces for performing surgical procedures are typically capable of cutting a variety of different types of tissue. In many surgical procedures, however, a practitioner desires to cut only some types of tissue while keeping other types of tissue intact.

SUMMARY

According to a first aspect, a control console for controlling vibrations of an ultrasonic handpiece is provided. The control console includes a signal generator for generating an AC drive signal applied to a transducer of the ultrasonic handpiece, which is coupled to and configured to vibrate a tip of the ultrasonic handpiece responsive to receiving the AC drive signal. Responsive to the signal generator sourcing the AC drive signal to the ultrasonic handpiece to vibrate the tip, the processor is configured to determine a property relating to a stiffness of tissue being contacted by the vibrating tip. The processor is then configured to adjust the AC drive signal output by the signal generator based on the determined property.

According to a second aspect, a method of operating the control console and/or performing the functions of the control console of the first aspect is provided.

Any of the above aspects can be implemented with any of the following implementations:

In one implementation, the ultrasonic handpiece is coupled to the control console and/or defines a lumen for providing suction at a surgical site.

In one implementation, the control console includes a sensor for measuring a voltage of the AC drive and a sensor for measuring a current of the AC drive signal. The processor is coupled to the sensors and configured to determine a tissue stiffness value for the tissue being contacted by the tip based on the measured current and voltage of the AC drive signal, and adjust the AC drive signal output by the signal generator based on the tissue stiffness value.

According to a third aspect, a control console for controlling vibrations of an ultrasonic handpiece is provided. The control console includes a signal generator for generating an AC drive signal applied to a transducer of the ultrasonic handpiece, which is coupled to and configured to vibrate a tip of the ultrasonic handpiece responsive to receiving the AC drive signal. The control console further includes a sensor for measuring a voltage of the AC drive signal, a sensor for measuring a current of the AC drive signal, and a processor coupled to the sensors and the signal generator. The processor is configured to determine a first displacement level for the tip that is a maximum displacement level for the tip and receive a tissue response model defining a stiffness threshold and second displacement levels for the tip that are each less than the first displacement level and associated within the tissue response model with a different potential tissue stiffness value greater than the stiffness threshold. The processor is further configured to determine a tissue stiffness value of tissue being contacted by the tip based on the measured voltage and current of the AC drive signal, and determine whether the determined stiffness value is less than or greater than the stiffness threshold. The processor is further configured to, responsive to determining that the determined stiffness value is less than the stiffness threshold, set a target displacement level for the tip of the ultrasonic handpiece to the first displacement level, and responsive to determining that the stiffness value is greater than the stiffness threshold, set the target displacement for the tip to the second displacement level associated with the potential tissue stiffness value corresponding to the determined tissue stiffness value. The processor is further configured to adjust the AC drive signal output by the signal generator to achieve the set target displacement level.

According to a fourth aspect, a method of operating the control console and/or performing the functions of the control console of the third aspect is provided.

Any of the above aspects can be combined in part, or in whole. Furthermore, any of the above aspects above can be implemented with any of the following implementations:

In one implementation, the ultrasonic handpiece is coupled to the control console and/or defines a lumen for providing suction at a surgical site.

In one implementation, the processor is configured to determine, as the determined tissue stiffness value, a mechanical resistance of the ultrasonic handpiece based on the measured voltage and current of the AC drive signal, the stiffness threshold is defined by a mechanical resistance threshold, and the potential tissue stiffness values are defined by potential mechanical resistances of the ultrasonic handpiece.

In one implementation, the processor is configured to determine the mechanical resistance of the ultrasonic handpiece based on the measured voltage and current of the AC drive signal by being configured to determine a capacitance of the transducer of the ultrasonic handpiece, determine a resonant frequency of the ultrasonic handpiece, set a frequency of the AC drive signal to the determined resonant frequency of the ultrasonic handpiece, calculate a current through mechanical components of the ultrasonic handpiece based on the capacitance of the transducer, the frequency of the AC drive signal, the measured voltage of the AC drive signal, and the measured current of the AC drive signal, and calculate the mechanical resistance of the ultrasonic handpiece based on the current through the mechanical components of the ultrasonic handpiece and the measured voltage of the AC drive signal.

In one implementation, the tissue response model defines the second displacement levels such that the second displacement levels decrease as the potential tissue stiffness values increase.

In one implementation, the stiffness threshold is a first stiffness threshold, the tissue response model defines a third displacement level for the tip that is a non-zero minimum tip displacement level for the tip and is less than each second displacement level, and defines a second stiffness threshold that is greater than the potential tissue stiffness values. The processor is configured to, responsive to the determined tissue stiffness value being greater than the second stiffness threshold, set the target displacement level for the tip to the third displacement level, and responsive to the determined tissue stiffness value being greater than the first stiffness threshold and less than the second stiffness threshold, set the target displacement level for the tip to the second displacement level associated with the potential tissue stiffness value corresponding to the determined tissue stiffness value.

In one implementation, at least one of the first displacement level, the second displacement level, the third displacement level, the first stiffness threshold, the second stiffness threshold, or the relationship between the second displacement levels and the potential tissue stiffness values is based on a user-setting.

In one implementation, the relationship between the second displacement levels and the potential tissue stiffness values is defined by a negative linear function that maps the first stiffness threshold to the first displacement level and maps the second stiffness threshold to the third displacement level.

In one implementation, the relationship between the second displacement levels and the potential tissue stiffness values is defined by a decreasing curve function that maps the first stiffness threshold to the first displacement level and maps the second stiffness threshold to the third displacement level.

In one implementation, the tissue response model is configured for reducing ablation of a type of tissue during operation of the ultrasonic handpiece, and the relationship between the second displacement levels and the potential tissue stiffness values is defined by a curved decreasing function that is based on a voltage of the AC drive signal corresponding to puncture of the type of tissue.

In one implementation, the curved decreasing function is further based on a resistance offset corresponding to vibrating components of the ultrasonic handpiece.

In one implementation, the tissue response model is a first tissue response model, and control console further comprises a memory storing the first tissue response model and a second tissue response model configured for ablating stiffer tissue than the first tissue response model. The processor is configured to receive a user selection of the first tissue response model and the second tissue response model via a user interface. The processor is configured to, responsive to the user selection of the first tissue response model and to the tip being placed against a first type of tissue, set the target displacement level to the first displacement level, and responsive to the user selection of the first tissue response model and to the tip being placed against a second type of tissue stiffer than the first type of tissue, set the target displacement level to a displacement level less than the first displacement level. The processor is further configured to, responsive to the user selection of the second tissue response model and to the tip being placed against the first and second types of tissues, set the target displacement level to the first displacement level.

In one implementation, the stiffness threshold is a first stiffness threshold, the potential tissue stiffness values are first potential tissue stiffness values, the second tissue response model defines a second stiffness threshold that is greater than the first stiffness threshold and associates the second displacement levels each with a different second potential tissue stiffness value greater than the second stiffness threshold, and at least one of the first potential tissue stiffness values is less than each of the second potential tissue stiffness values.

In one implementation, the relationship between the second displacement levels and the second potential tissue stiffness values is defined by a function that is based on a voltage of the AC drive signal corresponding to puncture of a third type of tissue stiffer than the second type of tissue.

In one implementation, the target displacement level for the tip corresponds to a target current through mechanical components of the ultrasonic handpiece, and the processor is configured to adjust the AC drive signal output by the signal generator to achieve the set target displacement level by being configured to adjust the AC drive signal so that an actual current through the mechanical components of the ultrasonic handpiece substantially equals the target current through the mechanical components of the ultrasonic handpiece.

According to a fifth aspect, a control console for controlling vibrations of an ultrasonic handpiece is provided. The control console includes a signal generator for generating an AC drive signal applied to a transducer of the ultrasonic handpiece, which is coupled to and configured to vibrate a tip of the ultrasonic handpiece responsive to receiving the AC drive signal. The control console further includes a processor coupled to the signal generator. The processor is configured to activate a stall mode in which displacement of the tip of the ultrasonic handpiece caused by the ultrasonic handpiece is non-zero and insufficient to ablate a tissue being contacted by the tip, and maintain a resonant frequency of the ultrasonic handpiece while the stall mode is active.

According to a sixth aspect, a method of operating the control console and/or performing the functions of the control console of the fifth aspect is provided.

Any of the above aspects can be combined in part, or in whole. Furthermore, any of the above aspects above can be implemented with any of the following implementations:

In one implementation, the ultrasonic handpiece is coupled to the control console and/or defines a lumen for providing suction at a surgical site.

In one implementation, the processor is configured to receive user input indicating a type of tissue desired to remain intact, and responsive to the tip being placed against the type of tissue during vibration of the tip by the control console, activate the stall mode.

In one implementation, the control console further comprises a sensor for measuring a voltage of the AC drive signal and a sensor for measuring a current of the AC drive signal. The processor is configured to determine a tissue stiffness value based on the measured voltage and current of the AC drive signal, determine whether the tissue stiffness value is greater than a stiffness threshold, and activate the stall mode responsive to determining that the tissue stiffness value is greater than the stiffness threshold.

In one implementation, the stiffness threshold is defined by a mechanical resistance threshold, and the processor is configured to determine, as the tissue stiffness value, a mechanical resistance of the ultrasonic handpiece based on the measured voltage and current of the AC drive signal.

In one implementation, the processor is configured to determine a second mechanical resistance of the ultrasonic handpiece based on a second voltage and current of the AC drive signal measured by the sensors when the stall mode is active, determine whether the second mechanical resistance is less than the stiffness threshold, and responsive to determining that the second mechanical resistance is less than the stiffness threshold: deactivate the stall mode, and adjust the AC drive signal output by the signal generator such that the displacement of the tip caused by the adjusted AC drive signal is at the maintained resonant frequency and is capable of ablating the tissue being contacted by the tip.

According to a seventh aspect, a control console for controlling vibrations of an ultrasonic handpiece is provided. The control console includes a signal generator for generating an AC drive signal applied to a transducer of the ultrasonic handpiece, which is coupled to and configured to vibrate a tip of the ultrasonic handpiece responsive to receiving the AC drive signal. The control console further includes a sensor for measuring a voltage of the AC drive signal, a sensor for measuring a current of the AC drive signal, and a processor coupled to the sensors and the signal generator. The processor is configured to determine a property of the ultrasonic handpiece associated with a tissue being contacted by the tip based on the measured voltage and the measured current of the AC drive signal, determine a target displacement for the tip based on the determined property and a puncture voltage corresponding to the tissue being contacted by the tip, and adjust the AC drive signal output by the signal generator to achieve the determined target displacement for the tip.

According to an eighth aspect, a method of operating the control console and/or performing the functions of the control console of the seventh aspect is provided.

Any of the above aspects can be combined in part, or in whole. Furthermore, any of the above aspects above can be implemented with any of the following implementations:

In one implementation, the ultrasonic handpiece is coupled to the control console and/or defines a lumen for providing suction at a surgical site.

According to a ninth aspect, a control console for controlling vibrations of an ultrasonic handpiece is provided. The control console includes a signal generator for generating an AC drive signal applied to a transducer of the ultrasonic handpiece, which is coupled to and configured to vibrate a tip of the ultrasonic handpiece responsive to receiving the AC drive signal. The control console further includes a sensor for measuring a voltage of the AC drive signal, a sensor for measuring a current of the AC drive signal, a memory storing a first tissue response model and a second tissue response model configured for ablating stiffer tissue than the first tissue response model, and a processor coupled to the sensors, memory, and signal generator. The processor is configured to determine a first displacement level for the tip that is a maximum displacement level for the tip and receive a user selection of the first tissue response model and the second tissue response model via a user interface. The processor is further configured to, responsive to the user selection of the first tissue response model and to the tip being placed against a first type of tissue, set a target displacement level for the tip to the first displacement level, and responsive to the user selection of the first tissue response model and to the tip being placed against a second type of tissue stiffer than the first type of tissue, set the target displacement level to a second displacement level that is less than the first displacement level. The processor is further configured to, responsive to the user selection of the second tissue response model and to the tip being placed against the first and second types of tissue, set the target displacement level to the first displacement level. The processor is further configured to adjust the AC drive signal output by the signal generator to achieve the set target displacement level for the tip.

According to a tenth aspect, a method of operating the control console and/or performing the functions of the control console of the ninth aspect is provided.

Any of the above aspects can be combined in part, or in whole. Furthermore, any of the above aspects above can be implemented with any of the following implementations:

In one implementation, the ultrasonic handpiece is coupled to the control console and/or defines a lumen for providing suction at a surgical site.

According to an eleventh aspect, a control console for controlling vibrations of an ultrasonic handpiece is provided. The control console includes a signal generator for generating an AC drive signal applied to a transducer of the ultrasonic handpiece, which is coupled to and configured to vibrate a tip of the ultrasonic handpiece responsive to receiving the AC drive signal. The control console further includes a sensor for measuring a voltage of the AC drive signal, a sensor for measuring a current of the AC drive signal, and a processor coupled to the sensors and the signal generator. The processor is configured to determine a mechanical resistance of the ultrasonic handpiece based on the measured voltage and the measured current of the AC drive signal, determine a target displacement for the tip based on the mechanical resistance, and adjust the AC drive signal output by the signal generator to achieve the determined target displacement for the tip.

According to a twelfth aspect, a method of operating the control console and/or performing the functions of the control console of the eleventh aspect is provided.

Any of the above aspects can be combined in part, or in whole. Furthermore, any of the above aspects above can be implemented with any of the following implementations:

In one implementation, the ultrasonic handpiece is coupled to the control console and/or defines a lumen for providing suction at a surgical site.

In one implementation, the processor is configured to determine the target displacement for the tip such that the target displacement represents a reduced displacement for the tip responsive to the determined mechanical resistance of the ultrasonic handpiece representing an increased mechanical resistance of the ultrasonic handpiece.

In one implementation, the processor is configured to determine the target displacement for the tip such that the target displacement represents the reduced displacement for the tip responsive to the determined mechanical resistance representing the increased mechanical resistance of the ultrasonic handpiece and the determined mechanical resistance being greater than a mechanical resistance threshold, and determine the target displacement for the tip such that the target displacement represents a maximum displacement level for the tip responsive to the determined mechanical resistance being less than the mechanical resistance threshold.

In one implementation, the processor is configured to determine a capacitance of the transducer of the ultrasonic handpiece; determine a resonant frequency of the ultrasonic handpiece; set a frequency of the AC drive signal to the determined resonant frequency of the ultrasonic handpiece; calculate a current through mechanical components of the ultrasonic handpiece based on the capacitance of the transducer, the measured voltage of the AC drive signal, and the measured current of the AC drive signal; and calculate the mechanical resistance of the ultrasonic handpiece based on the current through the mechanical components of the ultrasonic handpiece and the measured voltage of the AC drive signal In one implementation, the processor is configured to receive a tissue response model that defines the target displacement for the tip as a function of the mechanical resistance; and determine the target displacement for the tip based on the tissue response model and the mechanical resistance.

In one implementation, the tissue response model defines tip displacement levels decreasing over increasing mechanical resistance values.

In one implementation, the tissue response model defines a maximum tip displacement level associated with a first mechanical resistance threshold, a minimum tip displacement level associated with a second mechanical resistance threshold greater than the first mechanical resistance threshold, and intermediate tip displacement levels between the maximum and minimum tip displacement levels and associated with intermediate mechanical resistance values between the first and second mechanical resistance thresholds, the intermediate tip displacement levels decreasing over the intermediate mechanical resistance values.

In one implementation, the processor is configured to select the maximum tip displacement level as the target displacement for the tip responsive to the determined mechanical resistance being less than the first mechanical resistance threshold, select the minimum tip displacement level as the target displacement for the tip responsive to the determined mechanical resistance being greater than the second mechanical resistance threshold; and select one of the intermediate tip displacement levels associated with the determined mechanical resistance responsive to the determined mechanical resistance being between the first and second mechanical resistance thresholds.

In one implementation, at least one of the maximum tip displacement level, the minimum tip displacement level, the first mechanical resistance threshold, the second mechanical resistance threshold, or a relationship between the intermediate tip displacement levels is based on a user-setting.

In one implementation, the intermediate tip displacement levels are defined by a decreasing curve function that maps the first mechanical resistance threshold to the maximum tip displacement level and maps the second mechanical resistance threshold to the minimum tip displacement level.

In one implementation, the intermediate tip displacement levels are defined according to a curved decreasing function that is based on a voltage corresponding to puncture of a tissue being contacted by the tip of the ultrasonic handpiece.

In one implementation, the curved decreasing function is further based on a resistance offset corresponding to vibrating components of the ultrasonic handpiece.

In one implementation, the control console includes a memory storing a plurality of tissue response models, each of the tissue response models being defined based on a voltage corresponding to puncture of a different type of tissue. The processor is configured to receive the tissue response model by being configured to receive a user selection of one of the types of tissue; and retrieve the tissue response model from the memory corresponding to the selected type of tissue.

In one implementation, the intermediate tip displacement levels are defined by a negative linear function that maps the first mechanical resistance threshold to the maximum tip displacement level and maps the second mechanical resistance threshold to the minimum tip displacement level.

In one implementation, the target displacement for the tip corresponds to a target current through mechanical components of the ultrasonic handpiece, and the processor is configured to adjust the AC drive signal output by the signal generator to achieve the determined target displacement by being configured to adjust the AC drive signal so that an actual current through the mechanical components of the ultrasonic handpiece substantially equals the target current through the mechanical components of the ultrasonic handpiece.

According to a thirteenth aspect, a control console for controlling vibrations of an ultrasonic handpiece is provided. The control console includes a signal generator for generating an AC drive signal applied to a transducer of the ultrasonic handpiece, which is coupled to and configured to vibrate a tip of the ultrasonic handpiece responsive to receiving the AC drive signal. The control console further includes a sensor for measuring a voltage of the AC drive signal, a sensor for measuring a current of the AC drive signal, and a processor coupled to the sensors and the signal generator. The processor is configured to receive a tissue response model defining a maximum tip displacement level for the tip of the ultrasonic handpiece associated with a first tissue stiffness value, a minimum tip displacement level for the tip of the ultrasonic handpiece associated with a second tissue stiffness value greater than the first tissue stiffness value, and intermediate tip displacement levels for the tip of the ultrasonic handpiece ranging between the maximum and minimum tip displacement levels, where the intermediate tip displacement levels are associated with and decreasing as a function of increasing intermediate tissue stiffness values ranging between the first and second tissue stiffness values. The processor is further configured to determine a stiffness value for a tissue being contacted by the tip of the ultrasonic handpiece based on the measured current and the measured voltage, determine a target displacement level for the tip based on the determined stiffness value and the tissue response model, and adjust the AC drive signal output by the signal generator to achieve the determined target displacement for the tip.

According to a fourteenth aspect, a method of operating the control console and/or performing the functions of the control console of the thirteenth aspect is provided.

Any of the above aspects can be combined in part, or in whole. Furthermore, any of the above aspects above can be implemented with any of the following implementations:

In one implementation, the ultrasonic handpiece is coupled to the control console and/or defines a lumen for providing suction at a surgical site.

Any of the above implementations can be utilized for any of the aspects described above. Any of the above implementations can be combined in whole, or in part, for any one or more aspects described above.

BRIEF DESCRIPTION OF THE DRAWINGS

Advantages of the present disclosure will be readily appreciated, as the same becomes better understood by reference to the following detailed description, when considered in connection with the accompanying drawings. Non-limiting and non-exhaustive instances of the present disclosure are described with reference to the following figures, wherein like numerals refer to like parts throughout the various views unless otherwise specified.

DETAILED DESCRIPTION

In the following description, numerous specific details are set forth in order to provide a thorough understanding of the present invention. It will be apparent to one having ordinary skill in the art, however, that the specific detail need not be employed to practice the present invention. In some instances, well-known materials or methods have not been described in detail in order to avoid obscuring the present invention.

Reference throughout this specification to "one instance," "an instance," "one example" or "an example" means that a particular feature, structure or characteristic described in connection with the instance or example is included in at least one instance or example of the present invention. Thus, appearances of the phrases "in one instance," "in an instance," "one example" or "an example" in various places throughout this specification are not necessarily all referring to the same instance or example. Furthermore, the particular features, structures or characteristics may be combined in any suitable combinations and/or sub-combinations in one or more instances or examples. In addition, it should be appreciated that the figures provided herewith are for explanation purposes to persons ordinarily skilled in the art and that the drawings are not necessarily drawn to scale.

Systems and methods for controlling an ultrasonic handpiece to implement tissue selection are disclosed herein. During a surgical procedure, a practitioner may use an ultrasonic handpiece to contact, cut, and ablate biological tissue. The practitioner often intends to cut and/or ablate some types of biological tissue, such as relatively soft tissue, while keeping other types of tissue, such as relatively stiffer tissue, intact. For instance, a practitioner may use the ultrasonic handpiece to cut and/or ablate portions of brain, intending to cut and/or ablate softer tissue, such as gray matter and white matter, without cutting and/or ablating higher stiffness tissue, such as blood vessels, dura mater, arachnoid mater, and pia mater.

The systems and methods may thus implement tissue selection to avoid cutting and/or ablating tissue that the practitioner desires to remain intact. Specifically, the systems and methods may control displacement of the tip of the ultrasonic handpiece based on a stiffness of the tissue in contact with the tip. Responsive to the tip contacting relatively stiffer tissue that the practitioner desires to remain intact, the systems and methods may reduce displacement of the tip so that the vibrations of the tip are insufficient to cut through and/or ablate the tissue without excessive force by the practitioner. By controlling vibrations of the tip in this manner, the practitioner is able to operate the ultrasonic handpiece with increased safety and avoid unintentional cutting and/or ablation. The systems and methods also provide improved tactile feel, allowing the practitioner to better appreciate contact with different types of tissue.

Figure 1:
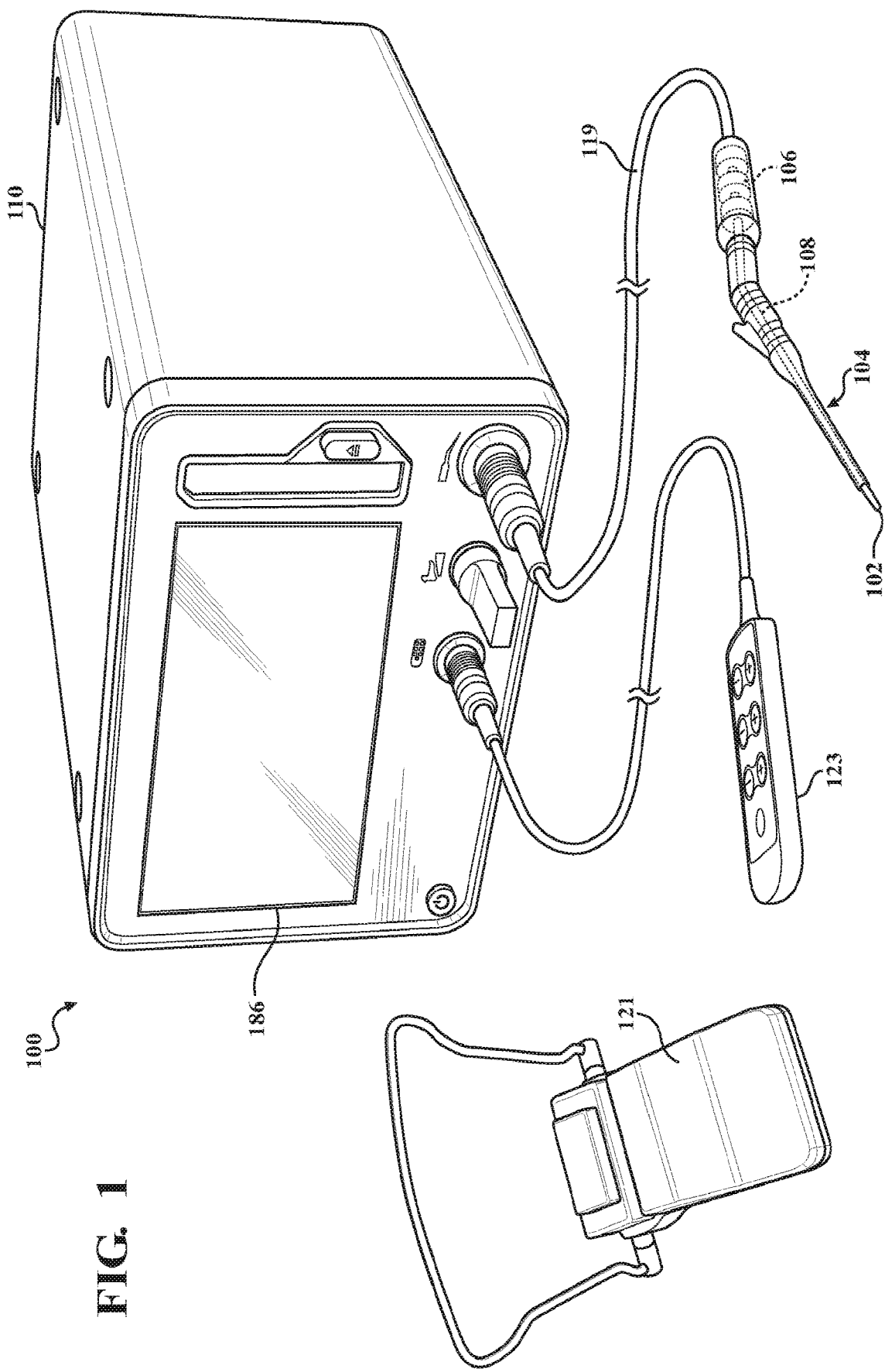
FIG. 1 is a perspective view of an ultrasonic tool system with tissue selection capability.

FIG. 1 illustrates a system 100 for controlling vibrations of a tip 102 of an ultrasonic handpiece 104 to implement tissue selection. The ultrasonic handpiece 104 may include a transducer 106 coupled to the tip 102. The transducer 106 may be a stack of piezoelectric drivers positioned at a proximate end of ultrasonic handpiece 104. The transducer 106 may be configured to vibrate the tip 102 in response to receiving an alternating current (AC) drive signal.

The ultrasonic handpiece 104 may define a lumen 108 extending from the proximate end of the ultrasonic handpiece 104 to the distal end of the tip 102. The lumen 108 may provide suction to a surgical site being treated by the ultrasonic handpiece 104. The ultrasonic handpiece 104 may also include a sleeve 109 disposed over the tip 102. The sleeve 109 may be spaced radially from the tip 102, and may be spaced longitudinally from the distal end of the tip 102. During treatment of tissue with the ultrasonic handpiece 104, irrigating fluid may be flowed through the gap between the tip 102 and the sleeve 109 to provide irrigation at the surgical site.

The ultrasonic handpiece 104 may be a surgical instrument that includes a cutting accessory (e.g., the tip 102) for treating biological tissue. For instance, the ultrasonic handpiece 104 may be the ultrasonic surgical handpiece disclosed in U.S. patent application Ser. No. 16/580,639, which is hereby incorporated herein by reference in its entirety. As disclosed in U.S. patent application Ser. No. 16/580,639, the tip 102 may include a cutting feature configured to cut, shape, and/or remove biological tissue. The tip 102 may have various other features, as described in U.S. Pat. Nos. 6,497,715; 6,955,680; and 6,984,220; which are also hereby incorporated herein by reference in their entirety.

The system 100 may include a control console 110 coupled to and driving the ultrasonic handpiece 104. The control console 110 may be configured to source an AC drive signal to the transducer 106 of the ultrasonic handpiece 104. Specifically, referring to FIG. 2, the control console 110 may include a signal generator 112 for generating an AC drive signal 114 sourced to the transducer 106 of the ultrasonic handpiece 104. The control console 110 may source the AC drive signal 114 over a cable 119 (shown in FIG. 1) to which the ultrasonic handpiece 104 is connected. The AC drive signal 114 may include an alternating voltage component $v_s$ and an alternating current component $i_s$. Responsive to receiving the AC drive signal 114, the transducer 106 may cause the tip 102 to vibrate in accordance with the voltage $v_s$ and the current $i_s$ of the AC drive signal 114.

Referring again to FIG. 1, the control console 110 may be configured to generate the AC drive signal 114 based on user input submitted to the control console 110 through a footswitch 121 or a remote 123 coupled to the control console 110. The control console 110 may also include a display 186 for presenting information to a practitioner. Non-limiting examples of presented information may include an identification of the ultrasonic handpiece 104 connected to the control console 110, and an operating state of the system 100. The display 186 may also be a touch screen display that enables a practitioner to provide user input to the control console 110, such as via on-screen controls.

Referring again to FIG. 2, the control console 110 may include a processor 122, memory 124, and a sensor 126. The processor 122 may include one or more devices selected from microprocessors, micro-controllers, digital signal processors, microcomputers, central processing units, field programmable gate arrays, programmable logic devices, state machines, logic circuits, analog circuits, digital circuits, and/or any other devices that manipulate signals (analog or digital) based on operational instructions stored in memory 124. Memory 124 may include a single memory device or a plurality of memory devices including, but not limited to, read-only memory (ROM), random access memory (RAM), volatile memory, non-volatile memory, static random access memory (SRAM), dynamic random access memory (DRAM), flash memory, cache memory, and/or any other device capable of storing information. Memory 124 may also include one or more persistent data storage devices such as non-volatile solid-state memory, EPROM, EEPROM, an RFID tag, and/or any other device capable of persistently storing information.

The processor 122 may be configured to implement the functions, features, processes, methods, and modules of the control console 110 described herein. In particular, the processor 122 may operate under the control of an operating system and/or one or more computer software applications residing in memory 124. The operating system may be configured, upon execution by the processor 122, to manage computer resources so each of the applications may be executed by the processor 122. Alternatively, the processor 122 may execute the applications directly, in which case the operating system may be omitted.

The applications and/or the operating system may each be configured upon execution to implement one or more of the functions, features, processes, methods and modules of the control console 110 described herein. Specifically, the applications and/or operating system may each be embodied by a set of computer-executable instructions residing in memory 124. Each set of computer-executable instructions may be configured, upon execution by the processor 122, to cause the processor 122 to implement one or more of the functions, features, processes, methods, and modules of the control console 110 described herein.

For example, the processor 122 may be configured, such as via execution of computer-executable instructions embodying one or more software applications residing in memory 124, to regulate the frequency and amplitude of the AC drive signal 114 generated by the signal generator 112, such as to implement tissue selection by the ultrasonic handpiece 104. In particular, the signal generator 112, shown as an alternating voltage source in FIG. 2, may include a power supply, an amplifier, and a transformer. The ultrasonic handpiece 104 may be coupled to a secondary winding of the transformer. During operation of the system 100, the power supply may output a constant voltage to the amplifier, which may be a variable gain amplifier. The processor 122 may be configured to also supply a control signal to the amplifier. The control signal may set a frequency and amplitude of a voltage generated by the amplifier from the constant voltage. The voltage generated by the amplifier may be applied across a primary winding of the transformer, which may cause the AC drive signal 114 to develop across the secondary winding. The voltage $v_s$ of the AC drive signal 114 developed across the secondary winding of the transformer may be proportional to the voltage applied across the primary winding, and the frequency of the AC drive signal 114 may be equivalent to frequency of the applied voltage. Thus processor 122 may thus be configured set the frequency and voltage $v_s$ of the AC drive signal 114 by being configured to set the frequency and voltage of the signal generated by the amplifier. An example signal generator of this type is disclosed in PCT Pub. WO 2016/183084 A1 and US Pat. Pub. No. 2018/0056328 A1, which are hereby incorporated by reference herein in their entirety.

One or more databases for collecting and organizing data used by processor 122 upon execution of the operating system and/or applications may also reside in memory 124. The databases may include data and supporting data structures that store and organize the data. The databases may be arranged with any database organization or structure including, but not limited to, a relational database, a hierarchical database, a network database, or combinations thereof. A database management system in the form of a computer software application executing as instructions on the processor 122 may be used to access the information or data stored in records of the databases in response to a query, where a query may be dynamically determined and executed by the processor 122.

For example, the one or more databases residing in memory 124 may organize tissue data 128. The tissue data 128 may indicate one or more tissue response models that define target displacement levels for the tip 102 of the ultrasonic handpiece 104 as a function of tissue stiffness, or more particularly, as a function potential tissue stiffness values corresponding to tissues of different stiffnesses. As described in more detail below, the potential tissue stiffness values may be defined by potential mechanical resistances of the ultrasonic handpiece 104.

Each tissue response model may be associated with a different user setting, which may be submitted via a user interface of the control console 110 (e.g., display 168, remote 123, footswitch 121), and which may indicate one or more types of tissue desired to be cut and/or ablated, and/or may indicate one or more types of tissue for which ablation and/or cutting is desired to be reduced or avoided. Upon activation of the control console 110, the processor 122 may be configured to receive a user setting, and to retrieve the tissue response model corresponding to the user setting from the tissue data 128. The processor 122 may then be configured to control displacement of the tip 102 based on the retrieved tissue response model to only cut and/or ablate desired types of tissue and/or avoid or reduce cutting and/or ablating non-desired types of tissue indicated by the user setting.

Figure 2:
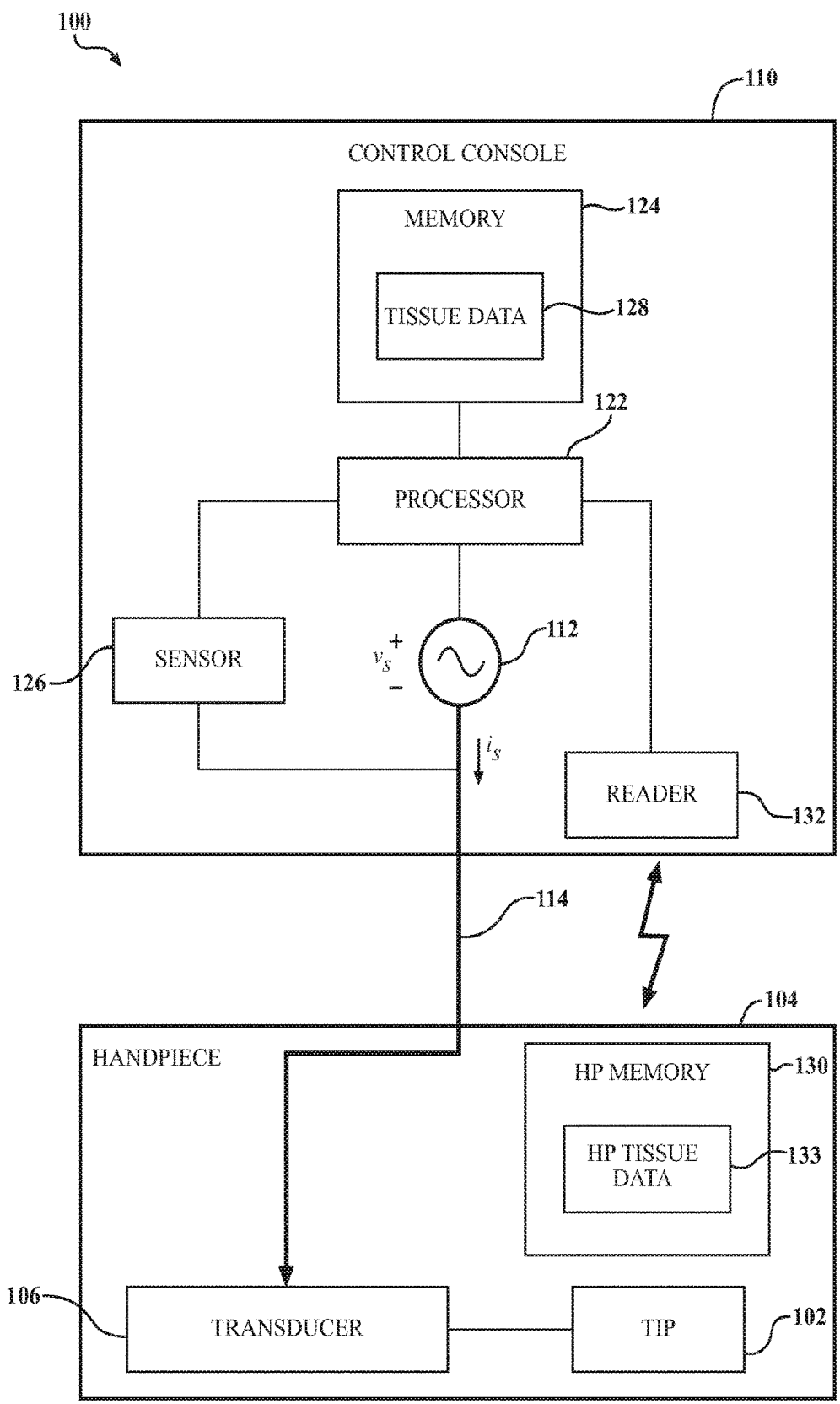
FIG. 2 is a schematic diagram of components of the system of FIG. 1.

The sensor 126 may be configured to measure the voltage $v_s$ and current $i_s$ of the AC drive signal 114, and to communicate these measurements to the processor 122. Although FIG. 2 illustrates the sensor 126 as a single sensor, the sensor 126 may include any suitable number of sensors for measuring the voltage $v_s$ and current $i_s$ of the AC drive signal 114. The sensor 126 may also include any suitable type of sensor for measuring the voltage $v_s$ and the current $i_s$ of the AC drive signal 114. For example, the sensor 126 may include a capacitive or resistive voltage sensor for measuring the voltage $v_s$, and may include an open-loop or closed-loop current sensor for measuring the current $i_s$.

The ultrasonic handpiece 104 may include handpiece (HP) memory 130, which may be disposed in the sleeve 109 of the ultrasonic handpiece 104. The HP memory 130 may store data specific to the ultrasonic handpiece 104 and/or tip 102, such as data identifying the ultrasonic handpiece 104 and/or tip 102, and data defining operational parameters specific to the ultrasonic handpiece 104 and/or tip 102. The HP memory 130 may include one or more of the memory devices described above in connection with the console memory 124, such as an EPROM, an EEPROM, or an RFID tag.

Upon connection of the ultrasonic handpiece 104 with the control console 110, the HP memory 130 may become communicatively coupled with a memory reader 132 of the control console 110. The memory reader 132 may be coupled to the processor 122, and may be configured, such as at the direction of the processor 122, to read data from and write data to the HP memory 130 when coupled to the memory reader 132. The structure of memory reader 132 may complement the HP memory 130. Thus, as examples, the memory reader 132 may be an assembly capable of reading data on an EPROM or EEPROM, or may be an assembly capable of interrogating and reading data from an RFID tag.

For instance, the HP memory 130 may store HP tissue data 133 specific to the ultrasonic handpiece 104 and/or tip 102. The HP tissue data 133 may be analogous to the tissue data 128 residing in the memory 124 of the control console 110. Specifically, different ultrasonic handpieces 104 and/or tips 102 may affect various types of tissue differently responsive to receiving a same AC drive signal 114. As an example, one type of tip 102 may include a cutting feature effective to cut a type of a tissue responsive to the ultrasonic handpiece 104 receiving a given AC drive signal 114, while another type of tip 102 may include another cutting feature that is relatively less effective at cutting the type of tissue responsive to the ultrasonic handpiece 104 receiving the given AC drive signal 114. The HP tissue data 133 residing in the HP memory 130 of an ultrasonic handpiece 104 may thus define a tissue response model or a set of tissue response models that differ from those defined by the HP tissue data 133 residing in the HP memory 130 of another ultrasonic handpiece 104.

Hence, responsive to the ultrasonic handpiece 104 being connected to the control console 110, the processor 122 may be configured to read the HP tissue data 133 specific to the ultrasonic handpiece 104 and/or tip 102 residing in the HP memory 130 via the memory reader 132, and to control displacement of the tip 102 based on one of the tissue response models defined by the retrieved HP tissue data 133 as described above. Alternatively, the tissue data 128 residing in the memory 124 of the control console 110 may associate each of several different ultrasonic handpiece 104 and/or tip 102 identifiers with a different tissue response model or with a different set of tissue response models. In this case, responsive to the ultrasonic handpiece 104 being connected to the control console 110, the processor 122 may be configured to read identification data from the HP memory 130 indicating an identifier for the ultrasonic handpiece 104 and/or tip 102, and to use one of the tissue response models associated with the identifier within the tissue data 128 to regulate displacement of the tip 102.

Figure 3:
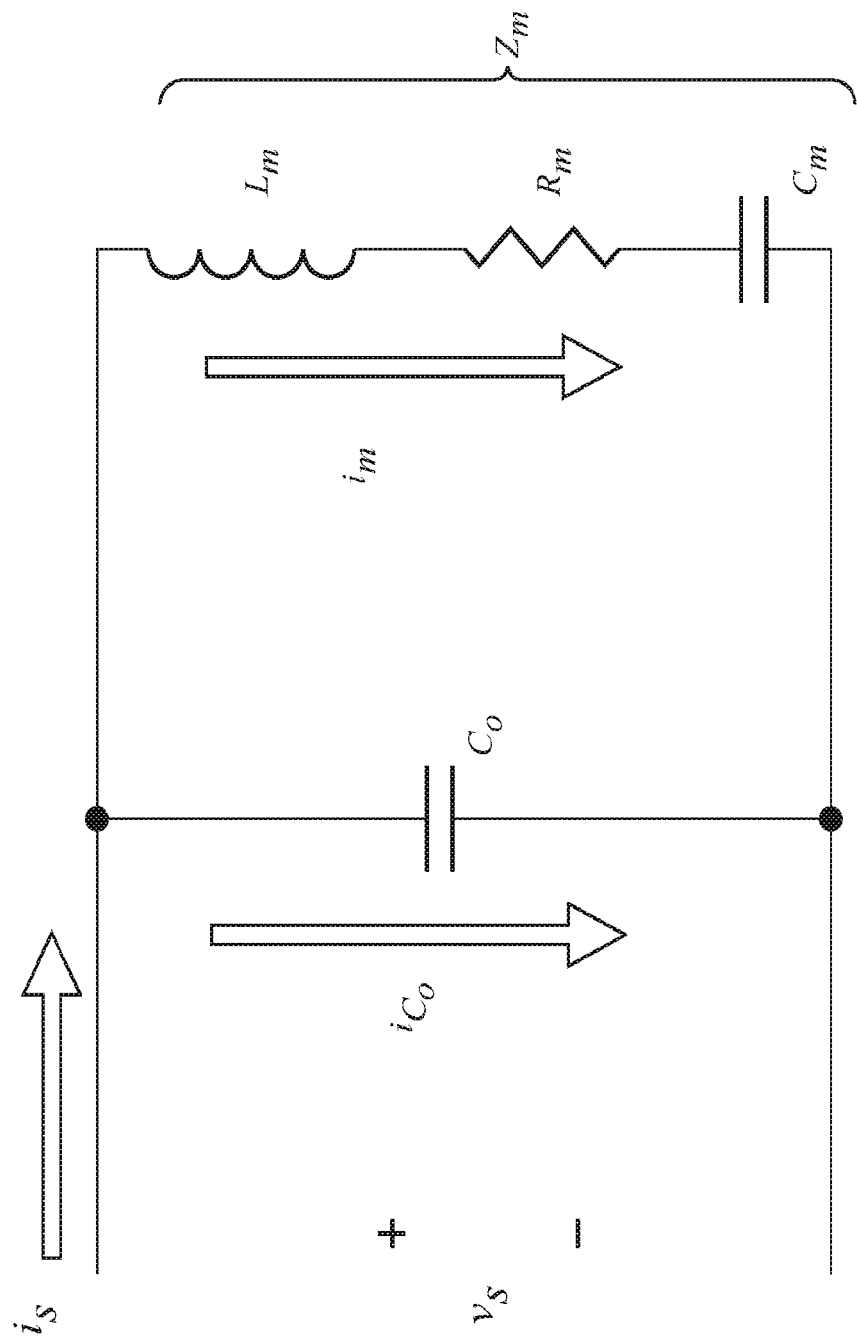
FIG. 3 is a circuit diagram modeling components of an ultrasonic handpiece.

FIG. 3 illustrates a circuit modeling components of the ultrasonic handpiece 104 during operation of the system 100. According to the model, the current $i_s$ of the AC drive signal 114 sourced to the ultrasonic handpiece 104 may be separated into two components: a current $i_{c_o}$ applied to the transducer 106 of the ultrasonic handpiece 32, and an equivalent of current $i_m$ through the mechanical components of the ultrasonic handpiece 104 (also referred to herein as "mechanical current $i_m$"). The impedance provided by the transducer 106 may be primarily capacitive. Accordingly, the transducer 106 may be represented in the circuit by a capacitor with capacitance $C_o$. The mechanical components of the ultrasonic handpiece 104, which may include the tip 102, the transducer 106, and other elements of the ultrasonic handpiece 104 that vibrate to apply cutting and/or ablating force on contacted tissue, may include an inductive component, a resistive component, and a capacitive component. Accordingly, the mechanical components may be represented in the circuit by an inductor with inductance $L_m$, a resistor with resistance $R_m$, and a capacitor with capacitance $C_m$. The equivalent of impedance $Z_m$ of the mechanical components of the ultrasonic handpiece 104 (also referred to herein as "mechanical impedance $Z_m$") may be a function of the inductance $L_m$, the resistance $R_m$, and the capacitance $C_m$.

The resistance $R_m$ of the ultrasonic handpiece 104 (also referred to herein as "mechanical resistance $R_m$") may be a function of both the vibrating components of the ultrasonic handpiece 104 and any substances, such as biological tissue, being contacted by vibrating components (e.g., the tip 102) of the ultrasonic handpiece 104. Correspondingly, when the tip 102 contacts tissue, the resistance $R_m$ may include a resistance of the tissue being contacted. The resistance of the tissue may indicate a stiffness of the tissue. As such, the mechanical resistance $R_m$ of the ultrasonic handpiece 104 may correspond to a stiffness of tissue being contacted by the tip 102 of the ultrasonic handpiece 104. The stiffness of contacted tissue may be understood to correspond to the elastic modulus of the given tissue, and the mechanical resistance $R_m$ of the ultrasonic handpiece 104 may vary as a function of the stiffness of the contacted tissue. Specifically, as the stiffness of tissue contacted by the tip 102 increases, the mechanical resistance $R_m$ may increase. Similarly, as the stiffness of tissue being contacted by the tip 102 decreases, the mechanical resistance $R_m$ may decrease.

The following relationships, relevant to the examples described below, can be derived from the circuit of FIG. 3 through various circuit analysis techniques:

$$i_{C_o} = j\omega C_o v_S \qquad (1)$$

$$i_m = i_s - j\omega C_o v_S \qquad (2)$$

$$Z_m = \frac{v_S}{i_m} \qquad (3)$$

Figure 4:
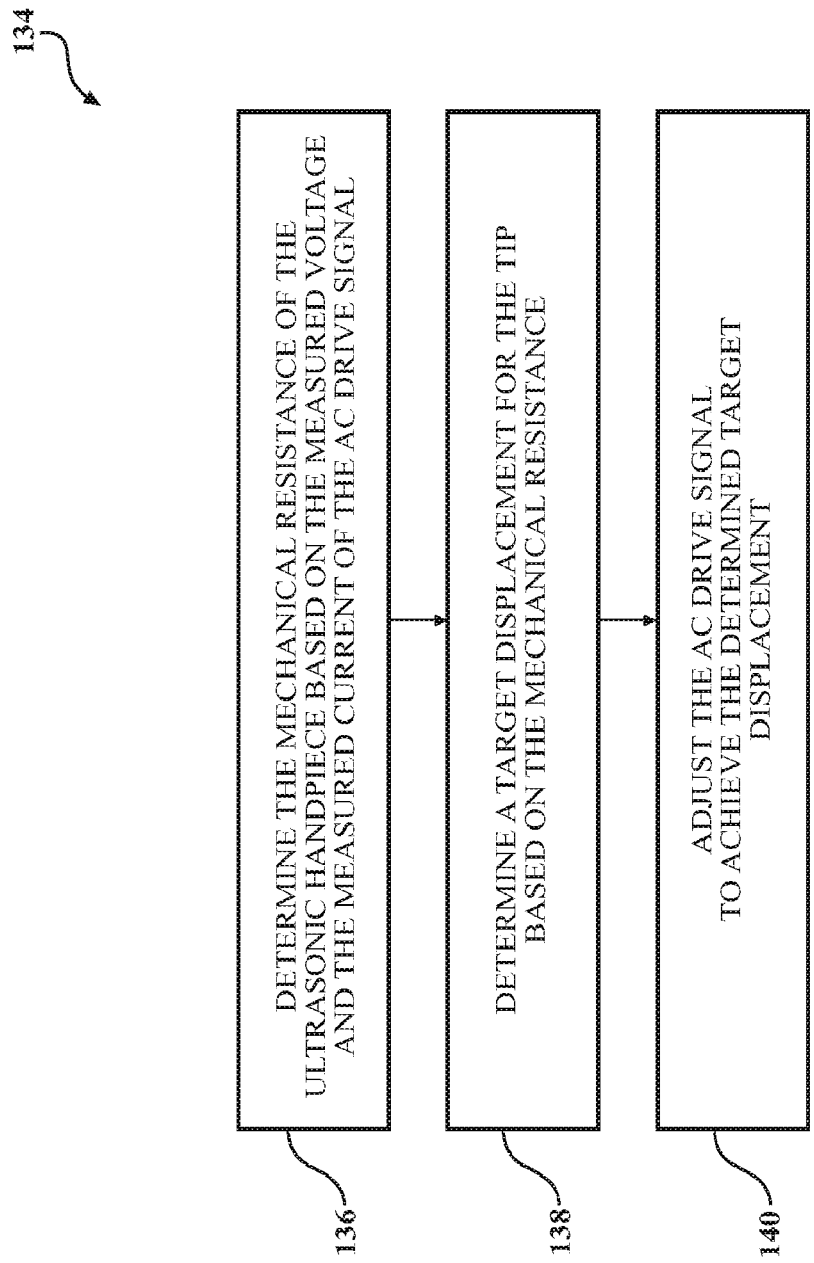
FIG. 4 is a flowchart of a method for implementing tissue selection during operation of an ultrasonic handpiece.

FIG. 4 illustrates a method 134 for regulating vibrations of the tip 102 of the ultrasonic handpiece 104 to implement tissue selection. In particular, the method 134 may regulate the vibrations of the tip 102 to cut desired tissue and avoid cutting tissue desired to remain intact. The method 134 may also provide an improved tactile feel that helps the practitioner differentiate between different types of tissues being contacted by the tip 102 of the ultrasonic handpiece 104. The processor 122 may be configured to perform the method 134, such as via a set of computer-executable instructions residing in memory 124 and configured, upon execution of the processor 122, to cause the processor 122 to perform the method 134. Each of the steps of the method 134 are discussed in more detail below.

In step 136, a property of the ultrasonic handpiece 104 associated with a tissue being contacted by the tip 102, such as stiffness value of the contacted tissue, may be determined based on the voltage $v_s$ of the AC drive signal 114 and the current $i_s$ of the AC drive signal 114, which may be measured by the sensor 126. As previously discussed, the mechanical resistance $R_m$ of the ultrasonic handpiece 104 may correspond to a stiffness of the tissue being contacted by the tip 102. The mechanical resistance $R_m$ may thus be determined and used as the determined stiffness value for the tissue being contacted by the tip 102.

In step 138, a target displacement for the tip 102 may be determined based on the determined property. The displacement of the tip 102 may correspond to an ability of the tip 102 to cut and/or ablate tissue. In particular, given a constant vibration frequency, increasing the displacement of the tip 102 per each vibratory cycle may increase the ability of the tip 102 to cut and/or ablate tissue. As such, if the mechanical resistance $R_m$ determined in step 136 corresponds to the tip 102 being against tissue in which a practitioner desires to cut and/or ablate according to current tissue selection settings, then the processor 122 may be configured to select a relatively high target displacement for the tip 102 to facilitate cutting the tissue. Alternatively, if the mechanical resistance $R_m$ determined in step 136 corresponds to the tip 102 being against tissue in which cutting and/or ablation is not desired according to current tissue selection settings, then the processor 122 may be configured to select a relatively low target displacement for the tip 102 so as to prevent the tip 102 from cutting and/or ablating the tissue.

For instance, the tissue selection settings may indicate to cut and/or ablate types of tissue having a stiffness less than a stiffness threshold (i.e., relatively softer tissue), and to avoid cutting types of tissue having a stiffness greater than the stiffness threshold (i.e., relatively stiffer tissue). As previously described, the mechanical resistance $R_m$ of the ultrasonic handpiece 104 may indicate the stiffness of tissue in contact with the tip 102. The stiffness threshold may therefore be defined in terms of mechanical resistance $R_m$. In step 138, responsive to the determined mechanical resistance $R_m$ of the ultrasonic handpiece 104 representing an increased mechanical resistance $R_m$ of the ultrasonic handpiece 104 and/or being greater than the stiffness threshold, the processor 122 may be configured to select a decreased target displacement for the tip 102 to avoid cutting and/or ablating the currently contacted tissue.

In step 140, the AC drive signal 114 output by the signal generator 112 and sourced to the ultrasonic handpiece 104 may be adjusted to achieve the determined target displacement for the tip 102. In particular, the processor 122 may be configured to generate a control signal that causes the signal generator 112 to generate an AC drive signal 114 that results in the determined target displacement for the tip 102.

Figure 5:
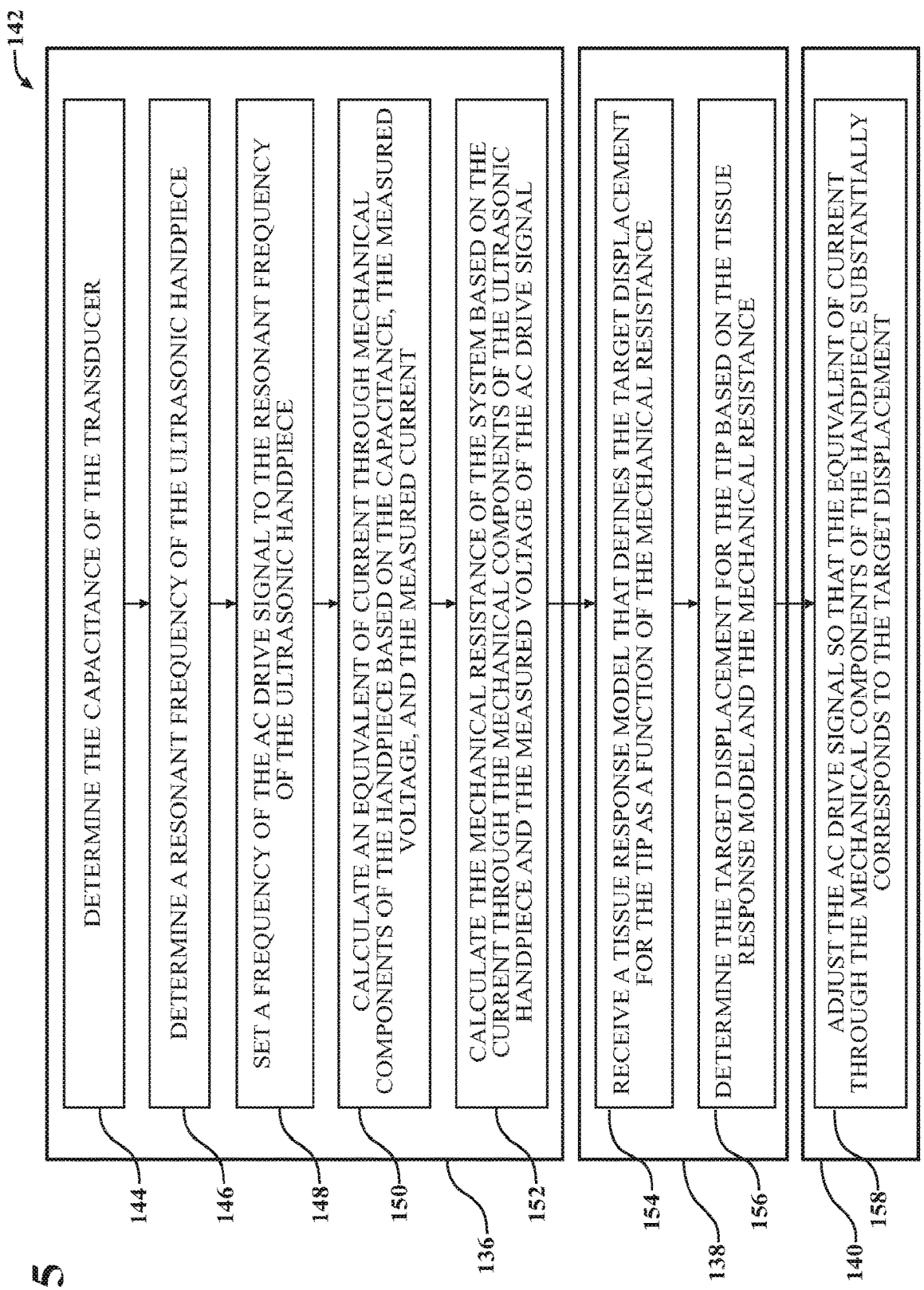
FIG. 5 is a flowchart illustrating additional details of the method of FIG. 4.

FIG. 5 also illustrates a method 142 for regulating vibrations of the tip 102 of the ultrasonic handpiece 104 to implement tissue selection. The steps of method 142 may be implemented in steps 136, 138, and 140 of the method 134 illustrated in FIG. 4. Thus, similar to the method 134, the method 142 may regulate the vibrations of the tip 102 to cut and/or ablate desired tissue and avoid cutting and/or ablating tissue desired to remain intact, and may also provide an improved tactile feel that helps the practitioner differentiate between different types of tissues being contacted by the tip 102 of the ultrasonic handpiece 104. The processor 122 may be configured to perform the method 142, such via a set of computer-executable instructions residing in the memory 124 and configured, upon execution of the processor 122, to cause the processor 122 to perform the method 142.

Steps 144 to 152 of the method 142 may be performed to determine the tissue stiffness value, or more particularly the mechanical resistance $R_m$ of the ultrasonic handpiece 104, in step 136 of the method 134. In step 144, the capacitance $C_o$ corresponding to the transducer 106 of the ultrasonic handpiece 104 may be determined. The capacitance $C_o$ of the transducer 106 may be considered constant during operation of the ultrasonic handpiece 104. Accordingly, the capacitance $C_o$ of the transducer 106 may be measured and stored in the HP memory 130 during production of the ultrasonic handpiece 104. Upon the ultrasonic handpiece 104 being connected to the control console 110 for a surgical operation, the processor 122 may be configured to read the capacitance $C_o$ of the transducer 106 from the HP memory 130, such as via the memory reader 132.

In step 146, the resonant frequency of the ultrasonic handpiece 104 may be determined. The processor 122 may be configured to determine the resonant frequency using a variety of methods. For instance, the processor 122 may be configured to perform a frequency sweep and determine the frequency in which the mechanical current $i_m$, as calculated using Equation (2) above, is at a minimum. Alternatively, the processor 122 may determine the resonant frequency using an iterative process of calculating a ratio of $i_{c_o}$ to $i_m$, and adjusting the frequency of the AC drive signal 114, as disclosed in U.S. Pat. No. 10,16,209. Thereafter, in step 148, the frequency of the AC drive signal 114 may be set to the determined resonant frequency. The processor 122 may be configured to generate and communicate a control signal corresponding to the resonant frequency to the signal generator 112, as described above.

In step 150, the mechanical current $i_m$ of the ultrasonic handpiece 104 may be calculated. As illustrated in Equation (2), this calculation may be based on the capacitance $C_o$ of the transducer 106, the measured voltage $v_s$ of the AC drive signal 114, the measured current $i_s$ of the AC drive signal 114, and the frequency of the AC drive signal 114 (e.g., the resonant frequency of the ultrasonic handpiece 104).

In step 152, the mechanical resistance $R_m$ of the ultrasonic handpiece 104 may be calculated based on the mechanical current $i_m$ and the measured voltage $v_s$ of the AC drive signal 114. In particular, the mechanical resistance $R_m$ may be equal to the real part of the mechanical impedance $Z_m$, which may be calculated using Equation (3). When the ultrasonic handpiece 104 is operating at resonance (i.e., when the frequency of the AC drive signal 114 is at a resonant frequency of the ultrasonic handpiece 104), the reactive components of the mechanical impedance $Z_m$ of the ultrasonic handpiece 104, namely the inductance $L_m$ and the capacitance $C_m$, may cancel each other out. As a result, the mechanical impedance $Z_m$ of the ultrasonic handpiece 32 may equal the mechanical resistance $R_m$ of the ultrasonic handpiece 32. In this case, the processor 122 may be configured to determine the mechanical resistance $R_m$ of the ultrasonic handpiece 104 using the following equation:

$$R_m = \frac{v_s}{i_m} \qquad (4)$$

where the voltage $v_s$ of the AC drive signal 114 may be measured by the sensor 126 and the mechanical current $i_m$ may be calculated using Equation (2). Alternatively, when the ultrasonic handpiece 104 is not operating at resonance (e.g., steps 146 and 148 are omitted), the processor 122 may be configured to determine the mechanical resistance $R_m$ of the ultrasonic handpiece 104 by calculating the real part of $Z_m$.

Steps 154 and 156 of the method 142 may be performed to determine the target displacement for the tip 102 in step 138 of the method 134. In step 154, a tissue response model (e.g., tissue response model 166A of FIG. 6) may be retrieved, such as by the processor 122. The tissue response model may define target displacements for the tip 102 as a function of potential tissue stiffness values, or more particularly potential mechanical resistances $R_m$, that may correspond to tissue in contact with the ultrasonic handpiece 104. In step 156, the target displacement for the tip 102 may be determined based on the tissue response model and the previous determined stiffness value corresponding to the stiffness of contacted tissue.

Step 158 of the method 142 may be performed to adjust the AC drive signal 114 to achieve the determined target displacement for the tip 102 in step 140 of the method 134. The displacement level of the tip 102 during a vibratory cycle may be proportional to the mechanical current $i_m$ of the ultrasonic handpiece 104. As the mechanical current $i_m$ increases, the displacement of the tip 102 may increase in proportion to the increase of the mechanical current $i_m$, and as the mechanical current $i_m$ decreases, the displacement of the tip 102 may decrease in proportion to the decrease in the mechanical current $i_m$. The target displacement for the tip 102 may thus correspond to a target mechanical current $i_{m\_target}$ for the ultrasonic handpiece 104. Accordingly, in step 158, the AC drive signal 114 may be adjusted so that the actual mechanical current $i_m$ of the ultrasonic handpiece 104 substantially equals a target mechanical current $i_{m\_target}$ corresponding to the target displacement (e.g., within twenty, ten, or two milliamps of the target mechanical current $i_{m\_target}$, within one milliamp of the target mechanical current $i_{m\_target}$, within 10%, 5%, or 1% of the of the target mechanical current $i_{m\_target}$).

Specifically, responsive to determining the target displacement for the tip 102, the processor 122 may be configured to adjust the AC drive signal 114 so that the actual mechanical current $i_m$ substantially equals the target mechanical current $i_{m\_Target}$ corresponding to the target displacement. For instance, the processor 122 may be configured to perform an iterative process, such as using a PID control loop, to generate a voltage $v_s$ of the AC drive signal 114 that causes the actual mechanical current $i_m$, as calculated using Equation (2), to substantially equal the target mechanical current $i_{m\_Target}$.

Figure 6:
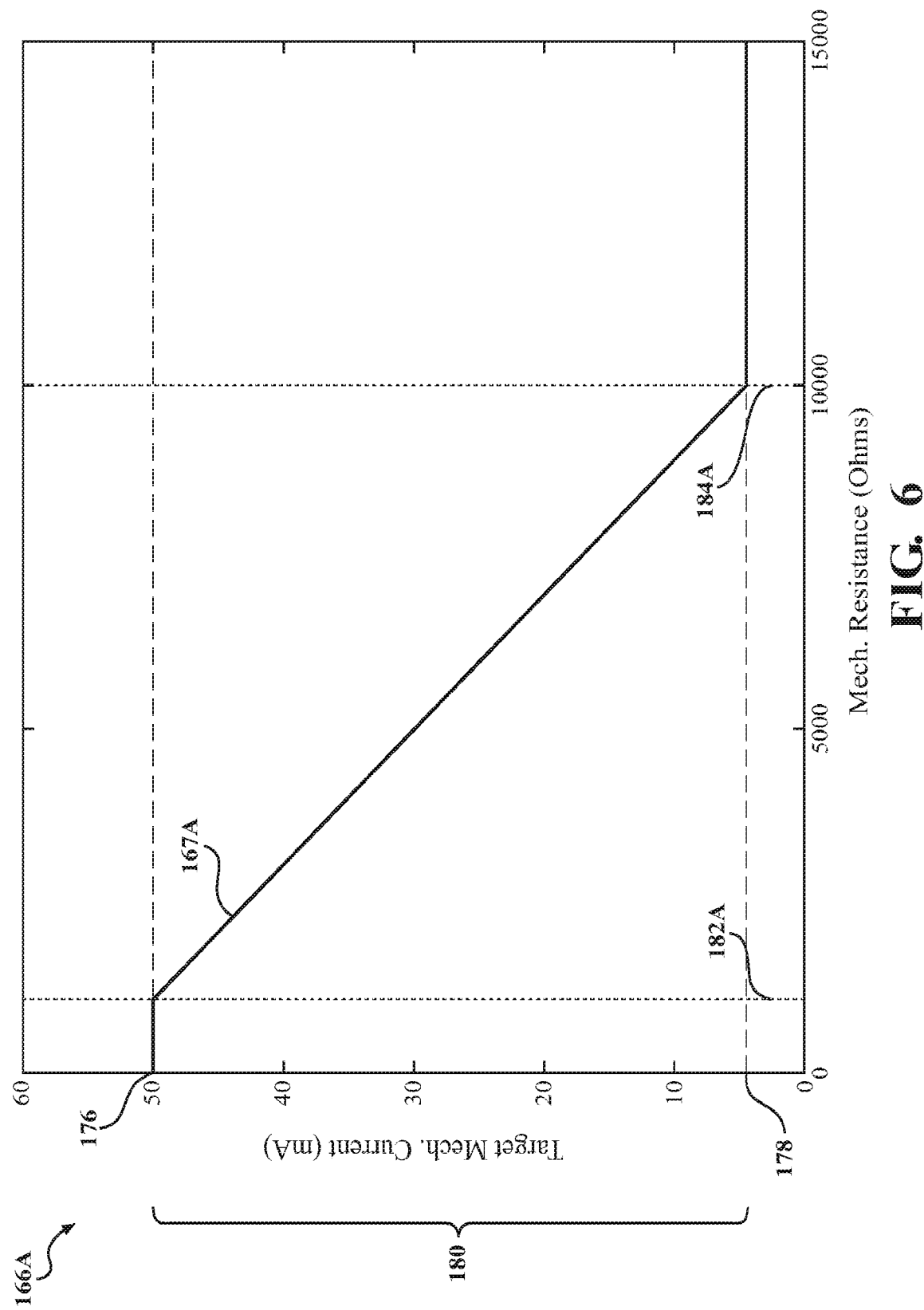
FIG. 6 is a graph of a tissue response model including a linear transition function.
Figure 7:
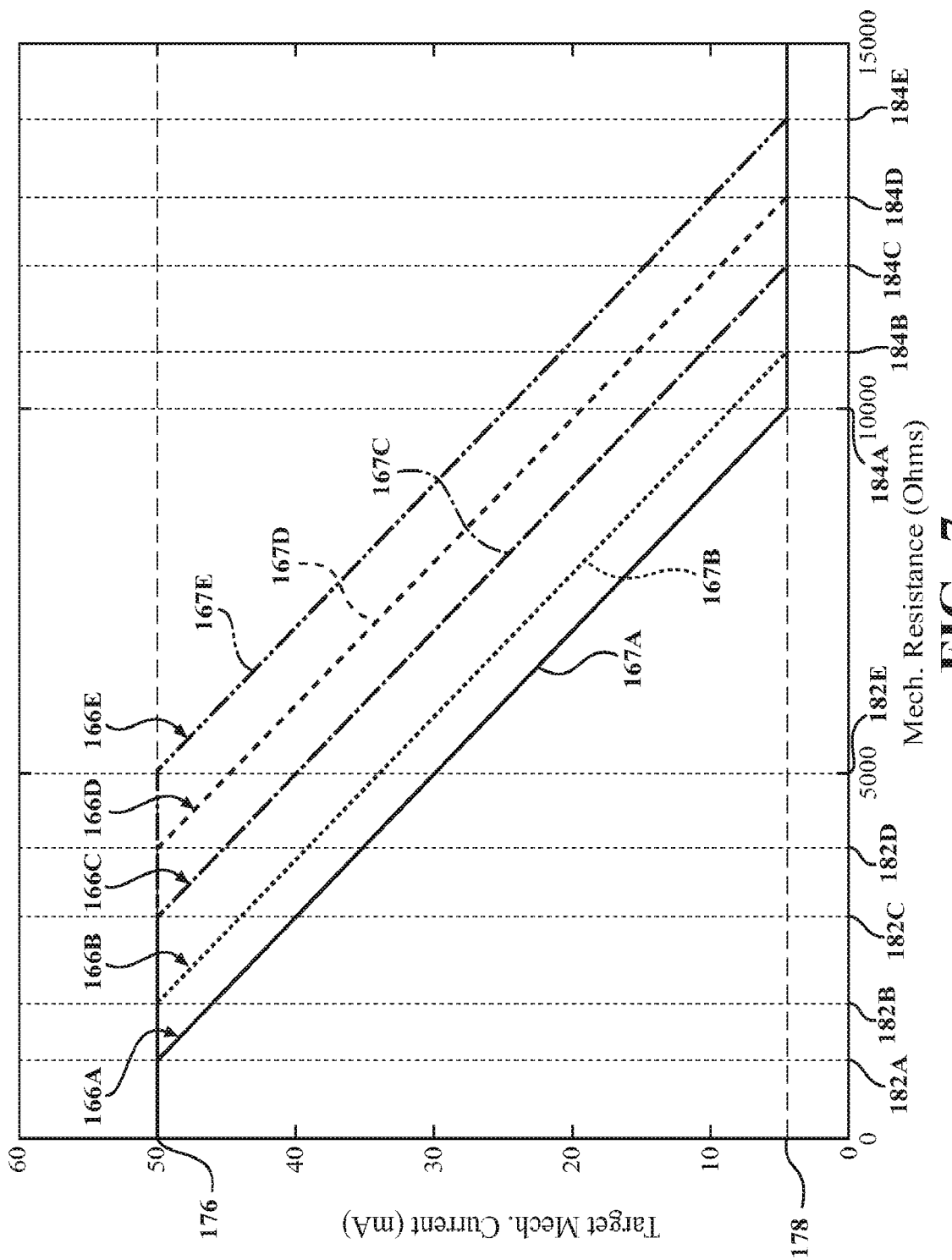
FIG. 7 is a graph of a plurality of tissue response models each including a linear transition function.
Figure 8:
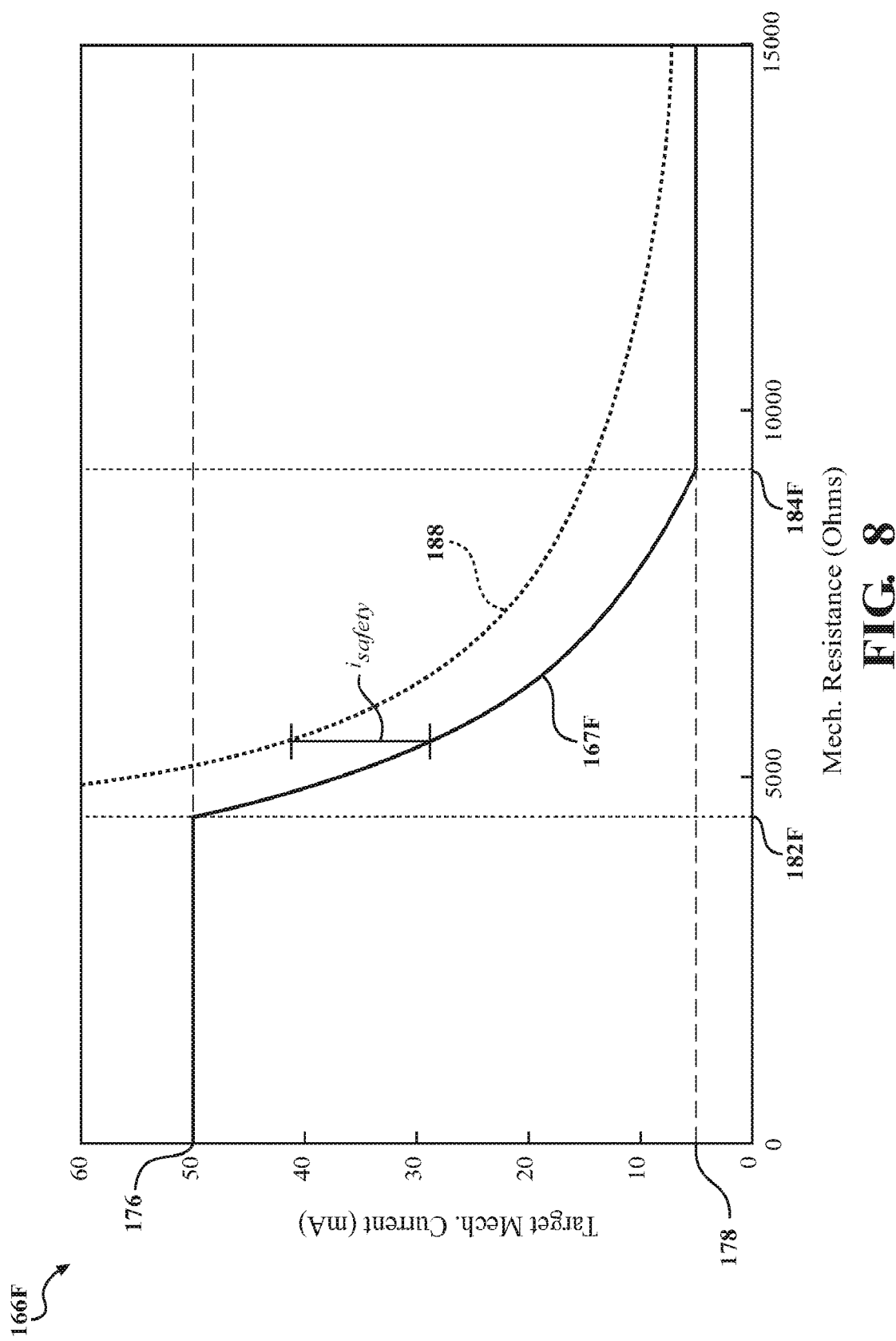
FIG. 8 is a graph of a tissue response model including a curved transition function.

FIGS. 6-8 illustrate a variety of example tissue response models 166 that may be used by the processor 122 to determine the target displacement for the tip 102 based on the determined tissue stiffness value, or more particularly based on the mechanical resistance $R_m$ of the ultrasonic handpiece 104. The illustrated tissue response models 166 are intended to be non-limiting, as other tissue response models that define target displacement for the tip 102 as a function of tissue stiffness value may be suitable.

Each tissue response model 166 may be represented by a graph in which the y-axis indicates target displacements and the x-axis indicates potential tissue stiffness values. The illustrated tissue response models 166 define tissue stiffness value in terms of mechanical resistance $R_m$ of the ultrasonic handpiece 104, and define target displacement in terms of target mechanical current $i_{m\_Target}$.

In other instances, a tissue response model may express target displacement in terms of an amplitude of displacement for the tip 102 during a vibratory cycle, and/or may express tissue stiffness value in terms of another characteristic derivable from the voltage $v_s$ and current $i_s$ of the AC drive signal 114. For example, a tissue response model may express target displacements in micrometers. In this case, the processor 122 may be configured to covert a determined target displacement for the tip 102 to a target mechanical current $i_{m\_Target}$ corresponding to the determined target displacement, such as via a lookup table. The processor 122 may then be configured to implement the target displacement by generating a control signal to the signal generator 112 that causes the mechanical current $i_m$ of the ultrasonic handpiece 104 to equal the determined target mechanical current $i_{m\_Target}$. As another example, the tissue response model may express tissue stiffness values in terms of the impedance of the ultrasonic handpiece 104, which may be determined by dividing the measured voltage $v_s$ of the AC drive signal 114 by the measured current $i_s$ of the AC drive signal 114.

Referring to FIG. 6 as an example, each tissue response model 166 may define a maximum tip displacement level 176, a minimum tip displacement level 178 less than the maximum tip displacement level 176, and a plurality of intermediate tip displacement levels extending between the maximum tip displacement level 176 and the minimum tip displacement level 178. The maximum tip displacement level 176 of each tissue response model 166 may be associated with potential tissue stiffness values less than or equal to a lower stiffness threshold 182, which may be represented by a lower mechanical resistance threshold, and the minimum tip displacement level 178 of each tissue response model 166 may be associated with potential tissue stiffness values greater than or equal to an upper stiffness threshold 184, which may be represented by an upper mechanical resistance threshold.

The intermediate tip displacement levels of each tissue response model 166 may be associated with intermediate potential tissue stiffness values, which may be represented by intermediate potential mechanical resistance $R_m$ values, extending between the lower stiffness threshold 182 and the upper stiffness threshold 184 according to a transition function 167. In particular, each intermediate tip displacement level may be based on application of a different intermediate tissue stiffness value to the transition function 167, and may thus be associated with a different potential intermediate tissue stiffness value within the tissue response model 166. The relationship between the intermediate tip displacement levels and the intermediate potential stiffness values may thus be defined by a transition function 167. The transition function 167 may be a decreasing function that decreases from the maximum tip displacement level 176 to the minimum tip displacement level 178 over a range of increasing intermediate potential tissue stiffness values (e.g., increasing mechanical resistance $R_m$ values).

The processor 122 may be configured to determine a target displacement for the tip 102 based on a retrieved tissue response model 166 in step 156 of the method 142 by determining whether the mechanical resistance $R_m$ of the ultrasonic handpiece 104 is less than or equal to the lower stiffness threshold 182, greater than or equal to the upper stiffness threshold 184, or between the lower stiffness threshold 182 and the upper stiffness threshold 184. Responsive to the mechanical resistance $R_m$ being less than the lower stiffness threshold 182, the processor 122 may select the maximum tip displacement level 176 as the target displacement level. Responsive to the mechanical resistance $R_m$ being greater than or equal to the upper stiffness threshold 184, the processor 122 may select the minimum tip displacement level 176 as the target displacement level. Responsive to the mechanical resistance $R_m$ being between the lower stiffness threshold 182 and the upper stiffness threshold 184, the processor 122 may set the target displacement level for the tip 102 as the intermediate tip displacement level associated with the mechanical resistance $R_m$ according to the transition function 167.

For example, referring to the tissue response model 166A of FIG. 6, the processor 122 may set 50 milliamps (mA) as the target displacement in response to the determined mechanical resistance $R_m$ being less than or equal to 1,000 Ohms. The processor 122 may set 5 mA as the target displacement in response to the determined mechanical resistance $R_m$ being greater than or equal to 10,000 Ohms. The processor 122 may set a target displacement between 50 mA and 5 mA in response to the determined mechanical resistance $R_m$ being between 1,000 Ohms and 10,000 Ohms. For instance, the processor 122 may set a target displacement of 30 mA in response to the determined mechanical resistance $R_m$ being 5,000 Ohms.

The maximum tip displacement level 176 of each tissue response model 166 may correspond to the maximum allowed displacement level for the tip 102 of the ultrasonic handpiece 104 during an operation. This level may be set by a user, such as using the display 186 of the control console 110. In particular, the memory 124 and/or the HP memory 130 may include data defining a global maximum displacement level for the ultrasonic handpiece 104. Prior to operation of the ultrasonic handpiece 104, a user may enter input to the control console 110 defining a percentage of the global maximum displacement level to use as the maximum tip displacement level 176. Such user input may be referred to as a "power level." Based on the power level submitted by the user, the processor 122 may be configured to set the maximum tip displacement level 176 to a percentage of the global maximum displacement level that corresponds to the power level. Referring to FIG. 6, for example, the global maximum displacement level of the ultrasonic handpiece 104 may be 100 mA, and the user-submitted power level may have been fifty percent, resulting in the processor 122 setting the maximum tip displacement level 176 to 50 mA.

The processor 122 may be configured operate the tip 102 at the maximum tip displacement level 176 when the stiffness of tissue being contacted by the tip 102 is such that the tissue stiffness value, or more particularly the mechanical resistance $R_m$ of the ultrasonic handpiece 104, is less than or equal to the lower stiffness threshold 182. The maximum tip displacement level 176 may be sufficient to cut and/or ablate types of tissue that, when contacted by the tip 102 of the ultrasonic handpiece 104, result in the mechanical resistance $R_m$ of the ultrasonic handpiece 104 being less than or equal to the lower stiffness threshold 182. In other words, the processor 122 may be configured to vibrate the tip 102 at a same tip displacement level, namely, at the maximum tip displacement level 176, for each contacted type of tissue with a stiffness that causes the mechanical resistance $R_m$ of the ultrasonic handpiece 104 to be less than or equal to the lower stiffness threshold 182.

Responsive to the tip 102 of the ultrasonic handpiece 104 contacting tissue having a stiffness that causes the determined tissue stiffness value, or more particularly the mechanical resistance $R_m$, to be greater than the lower stiffness threshold 182, the processor 122 may be configured to reduce displacement of the tip 102 according to the transition function 167, and thereby reduce the tip's 102 effectiveness at cutting and/or ablating the contacted tissue. The practitioner may feel the reduced vibrations and effectiveness of the tip 102 and interpret this event as an indication that the tip 102 is contacting or approaching tissue that is not desired to be cut and/or ablated. In response, the practitioner may back off the ultrasonic handpiece 104 from the tissue. The lower stiffness threshold 182 of each tissue response model 166 may thus define types of tissues desired to cut and/or ablated (e.g., tissues with stiffness values less than or equal to the lower stiffness threshold 182), and may define types of tissues to keep intact (e.g., tissues with stiffness values greater than the lower stiffness threshold 182).

In some instances, the processor 122 may be configured to determine the lower stiffness threshold 182 for each tissue response model 166 based on user input, such as the user input power level described above. For instance, for each tissue response model 166 usable by the processor 122 to control displacement of the tip 102, the tissue data 128 and/or HP tissue data 133 may define the transition function 167, the minimum tip displacement level 178, and the upper stiffness threshold 184, such that the transition function 167 intersects the minimum tip displacement level 178 at the upper stiffness threshold 184. Responsive to retrieving a tissue response model 166 from the tissue data 128 or the HP tissue data 133, the processor 122 may be configured to determine the intersection between the transition function 167 and the maximum tip displacement level 176 set by the user as the lower stiffness threshold 182 for the tissue response model 166.

The minimum tip displacement level 178 of each tissue response model 166 may correspond to a non-zero minimum tip displacement level for the tip 102, and may advantageously allow the ultrasonic handpiece 104 to enter a non-zero "stall mode" when the stiffness of contacted tissue indicates a relatively high stiffness value, namely, a mechanical resistance $R_m$ greater than or equal to the upper stiffness threshold 184, which may also be referred to herein as a stall threshold. This may occur when the tip 102 contacts tissue of a relatively high stiffness that is not desired to be cut and/or ablated, or when a practitioner continues pushing the tip 102 into tissue of a stiffness that is not desired to be cut and/or ablated. During the stall mode, the target displacement of the tip 102 may be set to the minimum tip displacement level 178 (e.g., 5 mA), which may be insufficient to cut and/or ablate the contacted tissue.

By setting the minimum tip displacement level 178 to a non-zero value, the processor 122 may continue tracking the resonant frequency of the ultrasonic handpiece 104 and correspondingly maintain operation of the ultrasonic handpiece 104 at resonance while in the stall mode. Such a configuration is advantageous in instances where the tip 102 transitions from contacting higher stiffness tissue not desired to be cut and/or ablated to contacting softer stiffness tissue desired to be cut and/or ablated. Maintaining operation of the ultrasonic handpiece 104 at resonance during the stall mode allows the processor 122 to continuously monitor the tissue being contacted by the tip 102 to determine when the tip 102 transitions to such softer tissue. Responsive to this transition, the processor 122 may be configured to adjust the AC drive signal 114 output by signal generator 112 such that the displacement of the tip 102 caused by the adjusted AC drive signal 114 is at the maintained resonant frequency of the ultrasonic handpiece 104 and is capable of cutting and/or ablating the tissue being contacted by the tip 102 (e.g., at the maximum tip displacement level 176). The processor 122 may perform this adjustment without having to first establish resonance, resulting in a relatively faster changeover back to a displacement level of the tip 102 sufficient to cut and/or ablate tissue.

Specifically, if the processor 122 stopped displacement of the tip 102 in the stall mode rather than placing the tip 102 at a non-zero displacement level, then the processor 122 may need to be configured to restart the ultrasonic handpiece 104 periodically or on demand to check for transition to softer stiffness tissue desired to be cut and/or ablated. Upon the ultrasonic handpiece 104 being restarted, the processor 122 may need to dedicate processing time to determine and set the frequency of the AC drive signal 114 to the resonant frequency, resulting in a relatively erratic and slower transition back to the maximum tip displacement level 176. The non-zero stall mode thus enables the processor 122 to relatively smoothly and quickly transition the tip 102 from the minimum tip displacement level 178 to the maximum tip displacement level 176.

The transition function 167 of each tissue response model 166 may be understood to define a sensitivity of the tissue response model 166. In particular, the transition function 167 may be a decreasing function that extends from the maximum tip displacement level 176 to the minimum tip displacement level 178. The faster the transition function 167 decreases from the maximum tip displacement level 176 to the minimum tip displacement level 178 over a range of stiffness values, the faster the processor 122 may be configured to place the ultrasonic handpiece 104 in the stall mode after the tip 102 contacts tissue to be avoided, and correspondingly, the more sensitive the tissue response model 166.

As illustrated in FIGS. 6 and 7, the transition function 167 of one or more of the stored tissue response models 166 may be a negative linear function having the form y=mx+b. For each of these tissue response models 166, m may be a negative slope indicative of the sensitivity of the tissue response model 166, and b may equal the difference between the minimum tip displacement level 178 of the tissue response model 166 and the product of m and the upper stiffness threshold 184 of the tissue response model 166. For instance, the transition function 167A of the tissue response model 166A illustrated in FIG. 6 may be defined by the above linear equation with m equal to $$-\frac{1 \text{ mA}}{200 \text{ Ohms}}$$

and b equal to 55 mA. As described in more detail below, the transition function 167 for one or more of the stored tissue response models 166 may also be a decreasing curve function.

The transition function 167 of each tissue response model 166 may provide advantages to a user of the ultrasonic handpiece 104 by providing gradually increasing tactile feedback to the user as the tip 102 contacts tissue of increasing stiffness. In particular, the force applied on the ultrasonic handpiece 104 when the tip 102 is vibrating against tissue increases with decreasing tip displacement and increasing tissue stiffness. According to the transition function 167, as the stiffness of tissue contacting the tip 102 increases from the lower stiffness threshold 182 to the upper stiffness threshold 184, the displacement of the tip 102 may decrease from the maximum tip displacement level 176 to the minimum tip displacement level 178. Correspondingly, as the tip 102 vibrates against increasingly stiffer tissue, the force applied on the ultrasonic handpiece 104 and felt by the user may gradually increase, which may function to provide feedback to the user that the tip 102 is contacting stiffer tissue not desired to be cut and/or ablated.

This configuration enables the user to appreciate by feel the stiffness of tissue being contacted by the tip 102, and indicates to the user when the tip 102 is in or near contact with tissue intended to be avoided prior to the ultrasonic handpiece 104 entering the stall mode. In particular, when the tip 102 initially contacts tissue having a stiffness corresponding to a mechanical resistance $R_m$ near the lower stiffness threshold 182, the practitioner may proceed to push the tip 102 against this tissue. As the practitioner continues pushing the tip 102 against the tissue, the mechanical resistance $R_m$ of the ultrasonic handpiece 104 may increase towards the upper stiffness threshold 184. The increased tactile feedback provided by reduced displacement of the tip 102 according to the transition function 167 may enable the practitioner to detect contact with the stiffer tissue prior to the mechanical resistance $R_m$ of the ultrasonic handpiece 104 reaching the upper stiffness threshold 184, and to responsively backtrack the tip 102 from the tissue. As a result, the practitioner may avoid entering the stall mode, and may avert damaging the tissue, which may occur if the practitioner continues applying excessive force onto the ultrasonic handpiece 104 that causes the tip 102 to penetrate the tissue.

As described above, the tissue data 128 and HP tissue data 133 may each define several tissue response models 166, each including different tissue selectivity settings (e.g., different lower stiffness threshold 182) and/or different sensitivity settings (e.g., different transition functions 167). The processor 122 may thus be configured to select one of these tissue response models 166 for regulating the ultrasonic handpiece 104 based on user input defining tissue selectivity and/or sensitivity. Specifically, prior to operation of the ultrasonic handpiece 104, a user may enter such input into the control console 110, such as via the display 186. Responsive to the control console 110 receiving the user input, the processor 122 may be configured to retrieve the tissue response model 166 that corresponds to the user input.

For instance, FIG. 7 illustrates tissue response models 166A-E that may be defined by the tissue data 128 or HP tissue data 133. Each tissue response model 166A-E may have a same tissue sensitivity, as indicated by the similar slope and length of their respective transition functions 167. However, the lower stiffness thresholds 182 of each tissue response model 166A-E differ, indicating that the tissue response models 166A-E have different tissue selectivity.

In particular, the tissue response model 166A may be configured to avoid cutting softer tissue than the tissue response model 166B, which may be configured to avoid cutting softer tissue than the tissue response model 166C, and so on. More specifically, the lower stiffness threshold 182A of the tissue response model 166A is less than the lower stiffness threshold 182B of the tissue response model 166B. Accordingly, if the tip 102 were to contact tissue of increasing stiffness, then the tissue response model 166A would cause the processor 122 to reduce displacement of the tip 102 before the tissue response model 166B would cause the processor 122 to reduce displacement of the tip 102. The tissue response model 166A may thus avoid cutting and/or ablating softer tissue than the tissue response model 166B. Hence, responsive to receiving user input indicating a tissue selectivity setting corresponding to avoidance of all but the softest tissue, the processor 122 may be configured to retrieve and implement the tissue response model 166A. Alternatively, responsive to receiving user input indicating a tissue selectivity setting corresponding to avoiding only the stiffest tissue, the processor 122 may be configured to retrieve and implement the tissue response model 167E.

As mentioned above, the relationship between the intermediate tip displacement levels and the intermediate potential stiffness values of one more of the tissue response models 166 may be defined by a decreasing curve function. The decreasing curve function of each of these tissue response models 166 may be configured to prevent puncturing of a different one or more types of tissue. Prior to operating the ultrasonic handpiece 32, a practitioner may provide a user selection of a type of tissue to avoid puncturing, ablating, and/or cutting. Responsive to receiving such input, the processor 122 may be configured to retrieve the tissue response model 166 corresponding to the selected type of tissue, and to regulate the displacement level of the tip 102 based thereon so as to avoid or reduce puncture of the indicated tissue type.

As an example, FIG. 8 illustrates a tissue response model 166F where the intermediate tip displacement levels are defined by a curved transition function 167F for preventing puncture of a specific type of tissue. In particular, FIG. 8 shows a tissue puncture curve 188 that corresponds to combinations of displacement levels and stiffness values at which puncturing the specific type tissue may occur. For instance, the tissue puncture curve 188 indicates the ultrasonic handpiece 104 may puncture the specific type of tissue when the mechanical current $i_m$ is 20 mA and the mechanical resistance $R_m$ of the of the ultrasonic handpiece 104 is 7500 Ohms. The tissue puncture curve 188 for a specific type of tissue may be determined empirically, as described in more detail below. The curved transition function 167F of the tissue response model 166F may be determined by subtracting a safety margin $i_{safety}$ from the tissue puncture curve 188, and may thus prevent or reduce puncture of the specific type of tissue associated with the tissue response model 166F during operation of the ultrasonic handpiece 104 according to the tissue response model 166F.

As described above, the tissue puncture curve 188 for a specific a type of tissue may be determined empirically. In particular, the tissue puncture curve 188 may be determined by operating the ultrasonic handpiece 104 against the type of tissue, and determining the average force needed to puncture the tissue (referred to herein as "force limit"). The tissue puncture curve 188 may then be calculated using the following formula:

$$i_{m\_puncture} = \frac{\text{Force Limit}}{R_m - R_{offset}} \quad (5)$$

Figure 9:
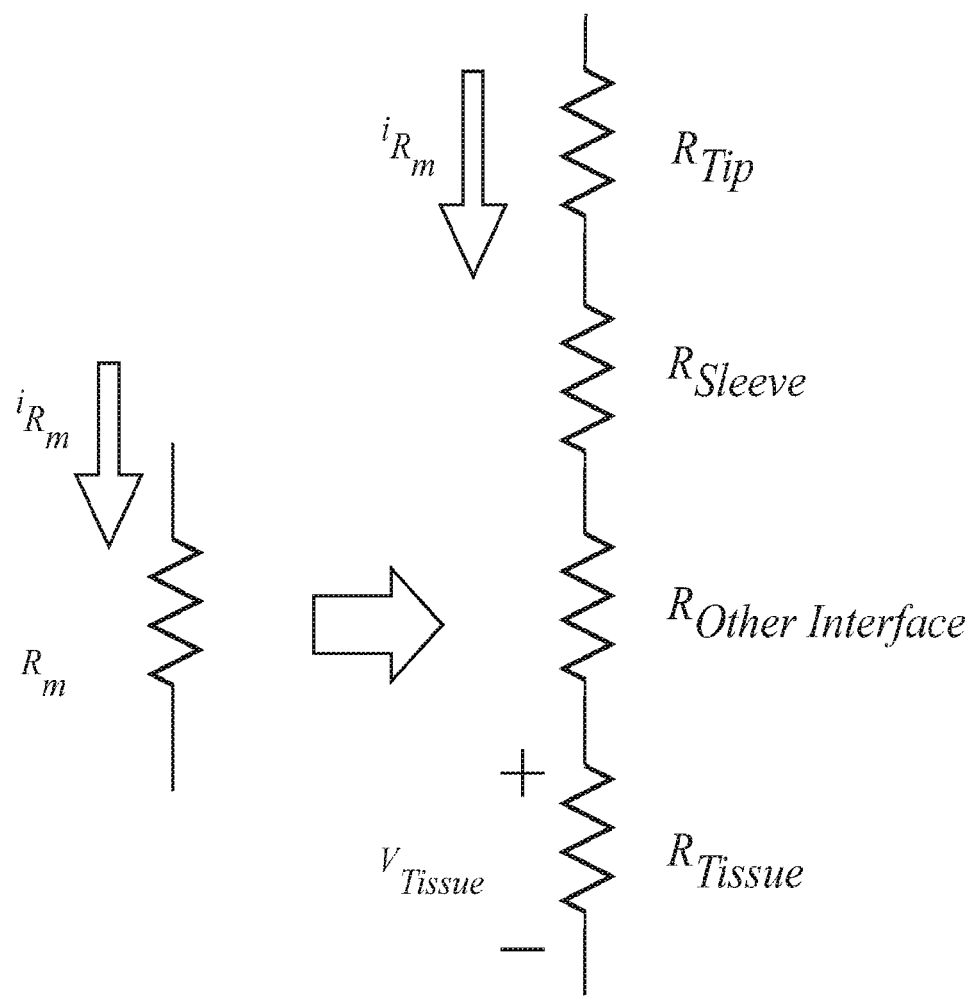
FIG. 9 is a circuit diagram of components that may contribute to mechanical resistance of an ultrasonic handpiece.

The force limit for a type of tissue may be represented by a puncture voltage $v_{Tissue}$ corresponding to puncture of the type of tissue. Referring to FIG. 9, during normal operation of the ultrasonic handpiece 104, the mechanical resistance $R_m$ of the ultrasonic handpiece 104 may be a function of several components, including the tissue in contact with the tip 102 and components of the ultrasonic handpiece 104 such as the tip 102, the sleeve 109 disposed over the tip 102, irrigation, suction, and interfaces between the tip 102 and the transducer 106. To determine a puncture voltage $v_{Tissue}$ corresponding to puncturing a type of tissue, the ultrasonic handpiece 104 may be applied to the type of tissue without one or more of these additional resistive components, such as the sleeve 109, irrigation, and suction, under various power level settings. The voltage $v_s$ of the AC drive signal 114 supplied to the ultrasonic handpiece 104 immediately before puncture of the type of tissue at each power level setting may be measured, and the average these measured voltages $v_s$ may be used as the force limit in Equation (5). $R_{offset}$ in Equation (5) may be a resistive offset corresponding to components other than tissue that contribute to the mechanical resistance $R_m$ of the ultrasonic handpiece 104, such as the vibrating components of the ultrasonic handpiece 104, and may be determined by calculating the mechanical resistance $R_m$ of the ultrasonic handpiece 104 as described above when the tip 102 is vibrating in water or air and not being pressed against tissue.

The above procedure may be used to generate the tissue puncture curve 188, and correspondingly the curved transition function 167F, so that displacement of the tip 102 is reduced to prevent or reduce puncture, cutting, and/or ablation of the type of tissue, but is not over-reduced, such as due to other components contributing to the mechanical resistance $R_m$. As shown in FIG. 8, the tissue puncture curve 188 and the curved transition function 167F are each curved decreasing functions. Because the force limit of Equation (5) is considered a constant value for each type of tissue, as the mechanical resistance $R_m$ of the ultrasonic handpiece 104 increases, the output of Equation (5), and correspondingly the curve transition function 167F, which may equal the output of Equation (5) minus the safety margin $i_{safety}$, decreases.

Systems and methods are described herein for implementing tissue selection during operation of an ultrasonic handpiece to avoid cutting types of tissue desired to remain intact. Specifically, these systems and methods may control displacement of the tip of the ultrasonic handpiece based on a stiffness of tissue in contact with the tip to avoid undesired cutting of tissue. Controlling an ultrasonic handpiece in this manner enables the practitioner to operate the ultrasonic handpiece with increased safety and avoid unintentional cutting. These systems and methods also provide improved tactile feel, allowing the practitioner to better appreciate contact with different types of tissue.

Although specific features of various instances of the disclosure may be shown in some drawings and not in others, this is for convenience only. In accordance with the principles of the disclosure, any feature of a drawing or other instance may be referenced and/or claimed in combination with any feature of any other drawing or instance.

This written description uses examples to describe instances of the disclosure and also to enable any person skilled in the art to practice the instances, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system for controlling vibrations of a tip of an ultrasonic handpiece, the system comprising:
    an ultrasonic handpiece comprising:
        a tip defining a lumen to provide suction at a surgical site, and
        a transducer coupled to the tip and configured to vibrate the tip responsive to receiving an AC drive signal; and
    a control console coupled to the ultrasonic handpiece, the control console comprising:
        a signal generator for generating the AC drive signal applied to the transducer,
        a sensor for measuring a voltage of the AC drive signal,
        a sensor for measuring a current of the AC drive signal, and
        a processor coupled to the sensors and the signal generator, the processor configured to:
            determine a first displacement level for the tip that is a maximum displacement level for the tip,
            receive a tissue response model defining a stiffness threshold and second displacement levels for the tip that are each less than the first displacement level and associated within the tissue response model with a different potential tissue stiffness value greater than the stiffness threshold,
            determine a tissue stiffness value of tissue being contacted by the tip based on the measured voltage and current of the AC drive signal,
            determine whether the determined tissue stiffness value is less than the stiffness threshold, responsive to determining that the determined tissue stiffness value is less than the stiffness threshold, set a target displacement level for the tip to the first displacement level, responsive to determining that the determined tissue stiffness value is greater than the stiffness threshold, set the target displacement level for the tip to the second displacement level associated with the potential tissue stiffness value corresponding to the determined tissue stiffness value, and adjust the AC drive signal output by the signal generator to the ultrasonic handpiece to achieve the set target displacement level.

2. The system of claim 1, wherein the processor is configured to determine, as the determined tissue stiffness value, a mechanical resistance of the ultrasonic handpiece based on the measured voltage and current of the AC drive signal, the stiffness threshold is defined by a mechanical resistance threshold, and the potential tissue stiffness values are defined by potential mechanical resistances of the ultrasonic handpiece.

3. The system of claim 1, wherein the tissue response model defines the second displacement levels such that the second displacement levels decrease as the potential tissue stiffness values increase.

4. The system of claim 1, wherein the stiffness threshold is a first stiffness threshold, the tissue response model defines a third displacement level for the tip that is a non-zero minimum tip displacement level for the tip and is less than each second displacement level, and defines a second stiffness threshold that is greater than the potential tissue stiffness values, and the processor is configured to:

responsive to the determined tissue stiffness value being greater than the second stiffness threshold, set the target displacement level for the tip to the third displacement level; and responsive to the determined tissue stiffness value being greater than the first stiffness threshold and less than the second stiffness threshold, set the target displacement level for the tip to the second displacement level associated with the potential tissue stiffness value corresponding to the determined tissue stiffness value.

5. The system of claim 4, wherein at least one of the first displacement level, the third displacement level, the first stiffness threshold, the second stiffness threshold, or the relationship between the second displacement levels and the potential tissue stiffness values is based on a user-setting.

6. The system of claim 4, wherein the relationship between the second displacement levels and the potential tissue stiffness values is defined by a negative linear function that maps the first stiffness threshold to the first displacement level and maps the second stiffness threshold to the third displacement level.

7. The system of claim 4, wherein the relationship between the second displacement levels and the potential tissue stiffness values is defined by a decreasing curve function that maps the first stiffness threshold to the first displacement level and maps the second stiffness threshold to the third displacement level.

8. The system of claim 1, wherein the tissue response model is configured for reducing ablation of a type of tissue during operation of the ultrasonic handpiece, and the relationship between the second displacement levels and the potential tissue stiffness values is defined by a curved decreasing function that is based on a voltage of the AC drive signal corresponding to puncture of the type of tissue.

9. The system of claim 8, wherein the curved decreasing function is further based on a resistance offset corresponding to vibrating components of the ultrasonic handpiece.

10. The system of claim 1, wherein the tissue response model is a first tissue response model, and further comprising:

a memory storing the first tissue response model and a second tissue response model configured for ablating stiffer tissue than the first tissue response model, wherein the processor is configured to:

receive a user selection of the first tissue response model and the second tissue response model via a user interface;

responsive to the user selection of the first tissue response model and to the tip being placed against a first type of tissue, set the target displacement level to the first displacement level;

responsive to the user selection of the first tissue response model and to the tip being placed against a second type of tissue stiffer than the first type of tissue, set the target displacement level to a displacement level less than the first displacement level; and responsive to the user selection of the second tissue response model and to the tip being placed against the first and second types of tissues, set the target displacement level to the first displacement level.

11. The system of claim 10, wherein the stiffness threshold is a first stiffness threshold, the potential tissue stiffness values are first potential tissue stiffness values, the second tissue response model defines a second stiffness threshold that is greater than the first stiffness threshold and associates the second displacement levels each with a different second potential tissue stiffness value greater than the second stiffness threshold, and at least one of the first potential tissue stiffness values is less than each of the second potential tissue stiffness values.

12. The system of claim 11, wherein the relationship between the second displacement levels and the second potential tissue stiffness values is defined by a function that is based on a voltage of the AC drive signal corresponding to puncture of a third type of tissue stiffer than the second type of tissue.

13. The system of claim 1, wherein the target displacement level for the tip corresponds to a target current through mechanical components of the ultrasonic handpiece, and the processor is configured to adjust the AC drive signal output by the signal generator to achieve the set target displacement level by being configured to adjust the AC drive signal so that an actual current through the mechanical components of the ultrasonic handpiece substantially equals the target current through the mechanical components of the ultrasonic handpiece.

14. A system for controlling vibrations of a tip of an ultrasonic handpiece, the system comprising:

an ultrasonic handpiece comprising:

a tip defining a lumen to provide suction at a surgical site, and a transducer coupled to the tip and configured to vibrate the tip responsive to receiving an AC drive signal; and a control console coupled to the ultrasonic handpiece, the control console comprising:

a signal generator for generating the AC drive signal applied to the transducer, a sensor for measuring a voltage of the AC drive signal, a sensor for measuring a current of the AC drive signal, a memory storing a first tissue response model and a second tissue response model configured for ablating stiffer tissue than the first tissue response model, and a processor coupled to the sensors, memory, and signal generator, the processor configured to:

determine a first displacement level for the tip that is a maximum displacement level for the tip, receive a user selection of the first tissue response model and the second tissue response model via a user interface, responsive to the user selection of the first tissue response model and to the tip being placed against a first type of tissue, set a target displacement level for the tip to the first displacement level, responsive to the user selection of the first tissue response model and to the tip being placed against a second type of tissue stiffer than the first type of tissue, set the target displacement level to a second displacement level that is less than the first displacement level, responsive to the user selection of the second tissue response model and to the tip being placed against the first and second types of tissue, set the target displacement level to the first displacement level, and adjust the AC drive signal output by the signal generator to achieve the set target displacement level for the tip.

15. A system for controlling vibrations of a tip of an ultrasonic handpiece, the system comprising:

an ultrasonic handpiece comprising:
　a tip defining a lumen to provide suction at a surgical site, and
　a transducer coupled to the tip and configured to vibrate the tip responsive to receiving an AC drive signal; and a control console coupled to the ultrasonic handpiece, the control console comprising:
　a signal generator for generating the AC drive signal applied to the transducer,
　a sensor for measuring a voltage of the AC drive signal,
　a sensor for measuring a current of the AC drive signal, and
　a processor coupled to the sensors and the signal generator, the processor configured to:
　　determine a mechanical resistance of the ultrasonic handpiece based on the measured voltage and the measured current of the AC drive signal,
　　determine a target displacement for the tip based on the mechanical resistance, and
　　adjust the AC drive signal output by the signal generator to achieve the determined target displacement for the tip.

16. The system of claim 15, wherein the processor is configured to determine the target displacement for the tip such that the target displacement represents a reduced displacement for the tip responsive to the determined mechanical resistance of the ultrasonic handpiece representing an increased mechanical resistance of the ultrasonic handpiece.

17. The system of claim 16, wherein the processor is configured to:

determine the target displacement for the tip such that the target displacement represents the reduced displacement for the tip responsive to the determined mechanical resistance representing the increased mechanical resistance of the ultrasonic handpiece and the determined mechanical resistance being greater than a mechanical resistance threshold; and determine the target displacement for the tip such that the target displacement represents a maximum displacement level for the tip responsive to the determined mechanical resistance being less than the mechanical resistance threshold.

18. The system of claim 15, wherein the processor is configured to:

receive a tissue response model that defines the target displacement for the tip as a function of the mechanical resistance; and determine the target displacement for the tip based on the tissue response model and the mechanical resistance.

19. The system of claim 18, wherein the tissue response model defines a maximum tip displacement level associated with a first mechanical resistance threshold, a minimum tip displacement level associated with a second mechanical resistance threshold greater than the first mechanical resistance threshold, and intermediate tip displacement levels between the maximum and minimum tip displacement levels and associated with intermediate mechanical resistance values between the first and second mechanical resistance thresholds, the intermediate tip displacement levels decreasing over the intermediate mechanical resistance values.

20. The system of claim 18, further comprising a memory storing a plurality of tissue response models, each of the tissue response models being defined based on a voltage corresponding to puncture of a different type of tissue, and the processor is configured to receive the tissue response model by being configured to:

receive a user selection of one of the types of tissue; and
retrieve the tissue response model from the memory corresponding to the selected type of tissue.

* * * * *